United States Patent
Sasagawa et al.

(10) Patent No.: US 7,960,481 B2
(45) Date of Patent: Jun. 14, 2011

(54) HYDROGENATED COPOLYMER AND COMPOSITION CONTAINING THE SAME

(75) Inventors: Masahiro Sasagawa, Yokohama (JP); Toshinori Shiraki, Yamato (JP); Shigeki Takayama, Tokyo (JP); Shigeru Sasaki, Yokohama (JP); Katsumi Suzuki, Kawasaki (JP); Takahiro Hisasue, Yokohama (JP); Kazuo Moritou, Kawasaki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 508 days.

(21) Appl. No.: 12/078,571

(22) Filed: Apr. 1, 2008

(65) Prior Publication Data

US 2008/0194716 A1 Aug. 14, 2008

Related U.S. Application Data

(62) Division of application No. 10/513,926, filed as application No. PCT/JP2003/008121 on Jun. 26, 2003, now Pat. No. 7,371,805.

(30) Foreign Application Priority Data

Jun. 27, 2002 (JP) ................................ 2002-187325
Jun. 28, 2002 (JP) ................................ 2002-189562
Mar. 27, 2003 (JP) ................................ 2003-087488

(51) Int. Cl.
*C08F 8/04* (2006.01)
*C08C 19/02* (2006.01)

(52) U.S. Cl. ..... 525/338; 526/335; 526/346; 525/326.1; 525/383; 525/342; 525/374

(58) Field of Classification Search .................. 526/346, 526/335; 525/383, 342, 374, 326.1, 338, 525/314

See application file for complete search history.

(56) References Cited

U.S. PATENT DOCUMENTS

| | | | | |
|---|---|---|---|---|
| 4,122,134 A | * | 10/1978 | Miki et al. | 525/272 |
| 4,738,996 A | * | 4/1988 | Vonk et al. | 524/59 |
| 5,109,069 A | | 4/1992 | Shibata et al. | |
| 5,747,598 A | * | 5/1998 | Coolbaugh et al. | 525/314 |
| 6,031,053 A | * | 2/2000 | Knoll et al. | 525/314 |

FOREIGN PATENT DOCUMENTS

| | | | |
|---|---|---|---|
| JP | 2-300250 | | 12/1990 |
| JP | 3-185058 | | 8/1991 |
| JP | 05-093125 | * | 4/1993 |
| JP | 5-93125 | | 4/1993 |
| JP | 7-118335 | | 5/1995 |
| JP | 7-238111 | | 9/1995 |
| WO | WO98/12240 | | 3/1998 |

OTHER PUBLICATIONS

U.S. Appl. No. 10/513,926, filed Nov. 10, 2004, Masahiro Sasagawa et al, Asahi Kasei Chemicals Corporation.
U.S. Office Action for co-pending U.S. Appl. No. 12/078,570, mailed on Sep. 1, 2010.
Notice of Allowance for co-pending U.S. Appl. No. 12/078,570, mailed on Feb. 18, 2011.

* cited by examiner

*Primary Examiner* — Ling-Siu Choi
(74) *Attorney, Agent, or Firm* — Staas & Halsey LLP

(57) ABSTRACT

A hydrogenated copolymer obtained by hydrogenating an unhydrogenated copolymer comprising conjugated diene monomer units and vinyl aromatic monomer units, the hydrogenated copolymer containing at least one hydrogenated copolymer block (B) which is obtained by hydrogenating an unhydrogenated random copolymer block comprised of conjugated diene monomer units and vinyl aromatic monomer units, wherein the hydrogenated copolymer has the following characteristics: the hydrogenated copolymer has a content of the vinyl aromatic monomer units of from more than 40% by weight to less than 95% by weight; at least one peak of loss tangent (tan δ) is observed at −10 to 80° C. in a dynamic viscoelastic spectrum obtained with respect to the hydrogenated copolymer; and substantially no crystallization peak ascribed to the copolymer block (B) is observed at −20 to 80° C. in a differential scanning calorimetry (DSC) chart obtained with respect to the hydrogenated copolymer.

9 Claims, No Drawings

HYDROGENATED COPOLYMER AND COMPOSITION CONTAINING THE SAME

CROSS-REFERENCE TO RELATED APPLICATIONS

This application is a divisional application of application Ser. No. 10/513,926, filed Nov. 10, 2004, now U.S. Pat. No. 7,371,805, which is a 371 of PCT/JP 2003/008121, filed Jun. 26, 2003 and claims the benefit of Japanese Application Nos. 2002-187325, filed Jun. 27, 2002, 2002-189562, filed Jun. 28, 2002, and 2003-087488, filed Mar. 27, 2003, respectively.

BACKGROUND OF THE INVENTION

1. Field of the Invention

The present invention relates to a hydrogenated copolymer. More particularly, the present invention is concerned with a hydrogenated copolymer obtained by hydrogenating an unhydrogenated copolymer comprising conjugated diene monomer units and vinyl aromatic monomer units, the hydrogenated copolymer comprising:

at least one polymer block selected from the group consisting of a polymer block (A) of vinyl aromatic monomer units, and a hydrogenated polymer block (C) which is obtained by hydrogenating an unhydrogenated polymer block of conjugated diene monomer units, wherein the unhydrogenated polymer block of conjugated diene monomer units has a specific vinyl bond content, and at least one hydrogenated copolymer block (B) which is obtained by hydrogenating an unhydrogenated random copolymer block comprised of conjugated diene monomer units and vinyl aromatic monomer units, wherein, when the hydrogenated copolymer contains no hydrogenated polymer block (C), the hydrogenated copolymer contains at least two polymer blocks (A), wherein the hydrogenated copolymer has a specific content of the vinyl aromatic monomer units, a specific content of the polymer block (A), a specific weight average molecular weight, a specific hydrogenation ratio as measured with respect to the double bonds in the conjugated diene monomer units, a characteristic that at least one peak of loss tangent (tan $\delta$) is observed at $-10$ to $80°$ C. in a dynamic viscoelastic spectrum obtained with respect to the hydrogenated copolymer, and a characteristic that, when the hydrogenated copolymer contains no hydrogenated polymer block (C), substantially no crystallization peak ascribed to the at least one hydrogenated copolymer block (B) is observed at $-20$ to $80°$ C. in a differential scanning calorimetry (DSC) chart obtained with respect to the hydrogenated copolymer.

The hydrogenated copolymer of the present invention has excellent properties with respect to flexibility, tensile strength, abrasion resistance, anti-impact scratch property and crosslinkability.

The present invention is also concerned with a first-order modified, hydrogenated copolymer obtained by modifying the hydrogenated copolymer, and a second-order modified, hydrogenated copolymer obtained by modifying the first-order modified, hydrogenated copolymer. The first-order modified, hydrogenated copolymer and the second-order modified, hydrogenated copolymer have excellent properties with respect to flexibility, tensile strength, abrasion resistance, anti-impact scratch property, adhesion properties and crosslinkability.

Further, the present invention is also concerned with a hydrogenated copolymer composition comprising the hydrogenated copolymer and at least one polymer selected from the group consisting of a thermoplastic resin and a rubbery polymer (hereinafter, the at least one polymer is frequently referred to as "component (b)"); a first-order modified, hydrogenated copolymer composition comprising the first-order modified, hydrogenated copolymer and the component (b); and a second-order modified, hydrogenated copolymer composition comprising the second-order modified, hydrogenated copolymer and the component (b).

The hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention are advantageous not only in that they are suitable for use as a foaming material, a building material, a vibration damping, soundproofing material, an electric wire coating material and the like, but also in that, when they are subjected to a crosslinking reaction in the presence of a crosslinking agent, there can be obtained crosslink products having excellent properties with respect to abrasion resistance, heat resistance and the like. Further, the hydrogenated copolymer of the present invention, the first-order modified, hydrogenated copolymer of the present invention, and the second-order modified, hydrogenated copolymer of the present invention can be advantageously used in an adhesive composition, an asphalt composition and the like.

2. Prior Art

With respect to a block copolymer comprising conjugated diene monomer units and vinyl aromatic hydrocarbon monomer units, when the vinyl aromatic hydrocarbon monomer unit content thereof is relatively low, the block copolymer exhibits, even if not vulcanized, not only excellent elasticity at room temperature, which is comparable to that of a conventional, vulcanized natural or synthetic rubber, but also excellent processability at high temperatures, which is comparable to that of a conventional thermoplastic resin. Therefore, such a block copolymer having a relatively low content of vinyl aromatic hydrocarbon monomer units is widely used in various fields, such as the fields of footwear, modifiers for plastics, modifiers for asphalts, and adhesive agents.

On the other hand, when the block copolymer comprising conjugated diene monomer units and vinyl aromatic hydrocarbon monomer units has a relatively high content of vinyl aromatic hydrocarbon monomer units, the block copolymer is a thermoplastic resin having excellent properties with respect to transparency and impact resistance. Therefore, such a block copolymer having a relatively high content of vinyl aromatic hydrocarbon monomer units can be advantageously used in various fields, such as the fields of packaging containers for food, packaging materials for household goods, packaging materials for household electric appliances, packaging materials for industrial parts, and toys.

Further, a hydrogenation product of the above-mentioned block copolymer has excellent weathering resistance and excellent heat resistance, so that the hydrogenation product is advantageously used not only in the above-mentioned various fields, but also in the fields of automobile parts, medical equipment and the like.

However, the above-mentioned block copolymer is disadvantageous in the following points. When the block copolymer has a relatively low content of vinyl aromatic hydrocarbon monomer units, although the block copolymer has excellent flexibility, the block copolymer has poor abrasion resistance, thus rendering it difficult to broaden the range of use of such a block copolymer. On the other hand, when the block copolymer has a relatively high content of vinyl aromatic hydrocarbon monomer units, the block copolymer has poor flexibility and, hence, is unsuitable for use as a flexible material.

With respect to a random copolymer comprising conjugated diene monomer units and vinyl aromatic hydrocarbon monomer units, it has been attempted to cause the random copolymer to exhibit excellent flexibility. For example, Unexamined Japanese Patent Application Laid-Open Specification No. Hei 2-158643 (corresponding to U.S. Pat. No. 5,109,069) discloses a composition containing a hydrogenated diene copolymer and a polypropylene resin, wherein the hydrogenated diene copolymer is obtained by hydrogenating a random copolymer which comprises conjugated diene monomer units and ylnyl aromatic hydrocarbon monomer units and which has a vinyl aromatic hydrocarbon monomer unit content of from 3 to 50% by weight, a molecular weight distribution of 10 or less (wherein the molecular weight distribution means the ratio (Mw/Mn) of the weight average molecular weight (Mw) to the number average molecular weight (Mn)), and a vinyl bond content of from 10 to 90% as measured with respect to the conjugated diene monomer units in the random copolymer. Further, Unexamined Japanese Patent Application Laid-Open Specification No. Hei 6-287365 discloses a composition containing a hydrogenated diene copolymer and a polypropylene resin, wherein the hydrogenated diene copolymer is obtained by hydrogenating a random copolymer which comprises conjugated diene monomer units and vinyl aromatic hydrocarbon monomer units and which has a vinyl aromatic hydrocarbon monomer unit content of from 5 to 60% by weight and a vinyl bond content of 60% or more as measured with respect to the conjugated diene monomer units in the random copolymer.

Meanwhile, with respect to the hydrogenated diene copolymers contained in the compositions disclosed in the above-mentioned patent documents, it has been attempted to use the hydrogenated diene copolymers as substitutes for a flexible vinyl chloride resin. The flexible vinyl chloride resin causes various environmental problems, such as generation of halogen gas when the resin is burned, and generation of environmental hormones due to the plasticizer used in the resin. Therefore, there is a pressing need for development of a substitute material for the flexible vinyl chloride resin. However, the above-mentioned hydrogenated diene copolymers have unsatisfactory properties with respect to abrasion resistance, anti-impact scratch property and the like which are important for a material used as a substitute for the flexible vinyl chloride resin.

In recent years, it has been attempted to cause the above-mentioned block copolymer comprising conjugated diene monomer units and vinyl aromatic hydrocarbon monomer units and having a relatively high content of vinyl aromatic hydrocarbon monomer units, to exhibit excellent flexibility.

For example, Japanese Patent Application Prior-to-Examination Publication (Tokuhyo) No. Hei 10-501833 (corresponding to U.S. Pat. No. 6,031,053) discloses a block copolymer comprising a conjugated diene polymer block and a conjugated diene/vinyl aromatic hydrocarbon copolymer block. However, this block copolymer has unsatisfactory abrasion resistance.

On the other hand, Unexamined Japanese Patent Application Laid-Open Specification No. Hei 2-300250 discloses a block copolymer comprising a conjugated diene polymer block and a vinyl aromatic hydrocarbon polymer block, wherein the conjugated diene polymer block comprises only isoprene monomer units or a mixture of isoprene monomer units and butadiene monomer units and has a total content of 3,4-vinyl bonds and 1,2-vinyl bonds of 40% or more, and wherein at least one peak of loss tangent (tan δ) is observed at 0° C. or more in a dynamic viscoelastic spectrum obtained with respect to the block copolymer. However, this block copolymer has unsatisfactory abrasion resistance.

WO98/12240 (corresponding to GB 0927210) discloses a molding material comprised mainly of a hydrogenated block copolymer which is obtained by hydrogenating a block copolymer comprising a polymer block comprised mainly of styrene monomer units and a copolymer block comprised mainly of butadiene monomer units and styrene monomer units. Further, Unexamined Japanese Patent Application Laid-Open Specification No. Hei 3-185058 discloses a resin composition comprising a polyphenylene ether resin, a polyolefin resin, and a hydrogenation product of a vinyl aromatic/conjugated diene random copolymer, wherein the hydrogenation product of a vinyl aromatic/conjugated diene random copolymer is substantially the same as the hydrogenated block copolymer used in the above-mentioned WO98/12240. However, any of the hydrogenated copolymers described in the above-mentioned patent documents has poor flexibility and, hence, is not suitable for use as a substitute for the flexible vinyl chloride resin.

Thus, although there has been a pressing need for development of a substitute material for the flexible vinyl chloride resin, which poses various environmental problems, there has not yet been obtained a material having desired properties (such as excellent flexibility and excellent abrasion resistance) which are comparable to those of the flexible vinyl chloride resin.

SUMMARY OF THE INVENTION

In this situation, the present inventors have made extensive and intensive studies with a view toward solving the above-mentioned problems accompanying the prior art. As a result, it has unexpectedly been found that the problems can be solved by a hydrogenated copolymer obtained by hydrogenating an unhydrogenated copolymer comprising conjugated diene monomer units and vinyl aromatic monomer units, the hydrogenated copolymer comprising:

at least one polymer block selected from the group consisting of a polymer block (A) of vinyl aromatic monomer units, and a hydrogenated polymer block (C) which is obtained by hydrogenating an unhydrogenated polymer block of conjugated diene monomer units, wherein the unhydrogenated polymer block of conjugated diene monomer units has a specific vinyl bond content, and at least one hydrogenated copolymer block (B) which is obtained by hydrogenating an unhydrogenated random copolymer block comprised of conjugated diene monomer units and vinyl aromatic monomer units, wherein, when the hydrogenated copolymer contains no hydrogenated polymer block (C), the hydrogenated copolymer contains at least two polymer blocks (A), wherein the hydrogenated copolymer has a specific content of the vinyl aromatic monomer units, a specific content of the polymer block (A), a specific weight average molecular weight, a specific hydrogenation ratio as measured with respect to the double bonds in the conjugated diene monomer units, a characteristic that at least one peak of loss tangent (tan δ) is observed at −10 to 80° C. in a dynamic viscoelastic spectrum obtained with respect to the hydrogenated copolymer, and a characteristic that, when the hydrogenated copolymer contains no hydrogenated polymer block (C), substantially no crystallization peak ascribed to the at least one hydrogenated copolymer block (B) is observed at −20 to 80° C. in a differential scanning calorimetry (DSC) chart obtained with respect to the hydrogenated copolymer.

Based on this finding, the present invention has been completed.

Accordingly, it is an object of the present invention to provide a hydrogenated copolymer having excellent properties with respect to flexibility, tensile strength, abrasion resistance, anti-impact scratch property and crosslinkability.

It is another object of the present invention to provide a first-order modified, hydrogenated copolymer obtained by modifying the hydrogenated copolymer, and a second-order modified, hydrogenated copolymer obtained by modifying the first-order modified, hydrogenated copolymer. The first-order modified, hydrogenated copolymer and the second-order modified, hydrogenated copolymer have excellent properties with respect to flexibility, tensile strength, abrasion resistance, anti-impact scratch property, adhesion properties and crosslinkability.

It is still another object of the present invention to provide a composition comprising any of the hydrogenated copolymer, the first-order modified, hydrogenated copolymer and the second-order modified, hydrogenated copolymer, as well as at least one polymer selected from the group consisting of a thermoplastic resin and a rubbery polymer (the at least one polymer is frequently referred to as "component (b)").

The foregoing and other objects, features and advantages of the present invention will be apparent from the following detailed description and appended claims.

DETAILED DESCRIPTION OF THE INVENTION

In one aspect of the present invention, there is provided a hydrogenated copolymer obtained by hydrogenating an unhydrogenated copolymer comprising conjugated diene monomer units and vinyl aromatic monomer units, the hydrogenated copolymer comprising:

at least one polymer block selected from the group consisting of a polymer block (A) of vinyl aromatic monomer units, and a hydrogenated polymer block (C) which is obtained by hydrogenating an unhydrogenated polymer block of conjugated diene monomer units, the unhydrogenated polymer block of conjugated diene monomer units having a vinyl bond content of less than 30%, and at least one hydrogenated copolymer block (B) which is obtained by hydrogenating an unhydrogenated random copolymer block comprised of conjugated diene monomer units and vinyl aromatic monomer units, wherein, when the hydrogenated copolymer contains no hydrogenated polymer block (C), the hydrogenated copolymer contains at least two polymer blocks (A), the hydrogenated copolymer having the following characteristics (1) to (6):

(1) the hydrogenated copolymer has a content of the vinyl aromatic monomer units of from more than 40% by weight to less than 95% by weight, based on the weight of the hydrogenated copolymer, (2) the hydrogenated copolymer has a content of the polymer block (A) of 0 to 60% by weight, based on the weight of the hydrogenated copolymer, (3) the hydrogenated copolymer has a weight average molecular weight of from 30,000 to 1,000,000, (4) the hydrogenated copolymer has a hydrogenation ratio of 75% or more, as measured with respect to the double bonds in the conjugated diene monomer units, (5) at least one peak of loss tangent (tan δ) is observed at −10 to 80° C. in a dynamic viscoelastic spectrum obtained with respect to the hydrogenated copolymer, and (6) when the hydrogenated copolymer contains no hydrogenated polymer block (C), substantially no crystallization peak ascribed to the at least one hydrogenated copolymer block (B) is observed at −20 to 80° C. in a differential scanning calorimetry (DSC) chart obtained with respect to the hydrogenated copolymer.

For easy understanding of the present invention, the essential features and various preferred embodiments of the present invention are enumerated below.

1. A hydrogenated copolymer obtained by hydrogenating an unhydrogenated copolymer comprising conjugated diene monomer units and vinyl aromatic monomer units, the hydrogenated copolymer comprising:

at least one polymer block selected from the group consisting of a polymer block (A) of vinyl aromatic monomer units, and a hydrogenated polymer block (C) which is obtained by hydrogenating an unhydrogenated polymer block of conjugated diene monomer units, the unhydrogenated polymer block of conjugated diene monomer units having a vinyl bond content of less than 30%, and at least one hydrogenated copolymer block (B) which is obtained by hydrogenating an unhydrogenated random copolymer block comprised of conjugated diene monomer units and vinyl aromatic monomer units, wherein, when the hydrogenated copolymer contains no hydrogenated polymer block (C), the hydrogenated copolymer contains at least two polymer blocks (A), the hydrogenated copolymer having the following characteristics (1) to (6):

(1) the hydrogenated copolymer has a content of the vinyl aromatic monomer units of from more than 40% by weight to less than 95% by weight, based on the weight of the hydrogenated copolymer, (2) the hydrogenated copolymer has a content of the polymer block (A) of 0 to 60% by weight, based on the weight of the hydrogenated copolymer, (3) the hydrogenated copolymer has a weight average molecular weight of from 30,000 to 1,000,000, (4) the hydrogenated copolymer has a hydrogenation ratio of 75% or more, as measured with respect to the double bonds in the conjugated diene monomer units, (5) at least one peak of loss tangent (tan δ) is observed at −10 to 80° C. in a dynamic viscoelastic spectrum obtained with respect to the hydrogenated copolymer, and (6) when the hydrogenated copolymer contains no hydrogenated polymer block (C), substantially no crystallization peak ascribed to the at least one hydrogenated copolymer block (B) is observed at −20 to 80° C. in a differential scanning calorimetry (DSC) chart obtained with respect to the hydrogenated copolymer.

2. The hydrogenated copolymer according to item 1 above, which comprises at least one hydrogenated polymer block (C), at least one hydrogenated copolymer block (B), and optionally at least one polymer block (A), wherein the hydrogenated copolymer further has the following characteristics (7) and (8):

(7) the hydrogenated copolymer has a content of the at least one hydrogenated polymer block (C) of from 10 to 50% by weight, a content of the at least one hydrogenated copolymer block (B) of from 30 to 90% by weight, and a content of the polymer block (A) of from 0 to 40% by weight, each based on the weight of the hydrogenated copolymer, and (8) the hydrogenated copolymer has a content of the vinyl aromatic monomer units of from more than 40% by weight to less than 90% by weight, based on the weight of the hydrogenated copolymer.

3. The hydrogenated copolymer according to item 2 above, wherein substantially no crystallization peak ascribed to the at least one hydrogenated copolymer block (B) is observed at −20 to 80° C. in a differential scanning calorimetry (DSC) chart obtained with respect to the hydrogenated copolymer.

4. The hydrogenated copolymer according to item 1 above, which comprises at least two polymer blocks (A) and at least one hydrogenated copolymer block (B), wherein the hydrogenated copolymer further has the following characteristics (9) and (10):
(9) the hydrogenated copolymer has a content of the vinyl aromatic monomer units of from more than 50% by weight to less than 95% by weight, based on the weight of the hydrogenated copolymer, and
(10) the hydrogenated copolymer has a content of the at least two polymer blocks (A) of from 5 to 60% by weight, based on the weight of the hydrogenated copolymer.

5. The hydrogenated copolymer according to item 1 above, which is a foam.

6. The hydrogenated copolymer according to item 1 above, which is a building material, a vibration damping, soundproofing material or an electric wire coating material.

7. A crosslinked hydrogenated copolymer obtained by subjecting the hydrogenated copolymer of item 1 above to a crosslinking reaction in the presence of a crosslinking agent.

8. A hydrogenated copolymer composition comprising:
1 to 99 parts by weight, relative to 100 parts by weight of the total of components (a-0) and (b), of (a-0) the hydrogenated copolymer of item 1 above, and
99 to 1 part by weight, relative to 100 parts by weight of the total of components (a-0) and (b), of (b) at least one polymer selected from the group consisting of a thermoplastic resin other than the hydrogenated copolymer (a-0) and a rubbery polymer other than the hydrogenated copolymer (a-0).

9. The hydrogenated copolymer composition according to item 8 above, which is a foam.

10. The hydrogenated copolymer composition according to item 8 above, which is a building material, a vibration damping, soundproofing material or an electric wire coating material.

11. A crosslinked hydrogenated copolymer composition obtained by subjecting the hydrogenated copolymer composition of item 8 above to a crosslinking reaction in the presence of a crosslinking agent.

12. An adhesive composition comprising:
100 parts by weight of the hydrogenated copolymer (a-0) of item 1 above, and
20 to 400 parts by weight of a tackifier (n).

13. An asphalt composition comprising:
0.5 to 50 parts by weight of the hydrogenated copolymer (a-0) of item 1 above, and
100 parts by weight of an asphalt (o).

14. A first-order modified, hydrogenated copolymer comprising the hydrogenated copolymer of item 1 above and a functional group-containing first-order modifier group bonded to the hydrogenated copolymer.

15. The first-order modified, hydrogenated copolymer according to item 14 above, wherein the first-order modifier group has at least one functional group selected from the group consisting of a hydroxyl group, a carbonyl group, a thiocarbonyl group, an acid halide group, an acid anhydride group, a carboxyl group, a thiocarboxyl group, an aldehyde group, a thioaldehyde group, a carboxylic ester group, an amide group, a sulfonic acid group, a sulfonic ester group, a phosphoric acid group, a phosphoric ester group, an amino group, an imino group, a cyano group, a pyridyl group, a quinoline group, an epoxy group, a thioepoxy group, a sulfide group, an isocyanate group, an isothiocyanate group, a silicon halide group, a silanol group, an alkoxysilane group, a tin halide group, an alkoxy tin group and a phenyl tin group.

16. The first-order modified, hydrogenated copolymer according to item 15 above, wherein the first-order modifier group has at least one functional group selected from the group consisting of the functional groups represented by the following formulae (1) to (14):

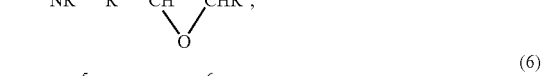
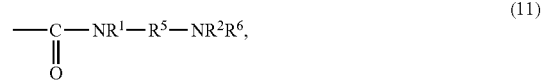
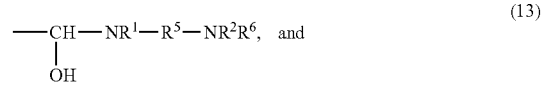

wherein, in the formulae (1) to (14):
N represents a nitrogen atom, Si represents a silicon atom, O represents an oxygen atom, C represents a carbon atom, and H represents a hydrogen atom,
each of $R^1$ to $R^4$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group,
each $R^5$ independently represents a $C_1$-$C_{48}$ hydrocarbon group which optionally has at least one functional group selected from the group consisting of a hydroxyl group, an epoxy group, an amino group, a silanol group and a $C_1$-$C_{24}$ alkoxysilane group, and each $R^6$ independently represents a hydrogen atom or a $C_1$-$C_8$ alkyl group.

17. The first-order modified, hydrogenated copolymer according to item 14 above, which is a foam.
18. A crosslinked, first-order modified, hydrogenated copolymer obtained by subjecting the first-order modified, hydrogenated copolymer of item 14 above to a crosslinking reaction in the presence of a crosslinking agent.
19. A first-order modified, hydrogenated copolymer composition comprising:
    1 to 99 parts by weight, relative to 100 parts by weight of the total of components (a-1) and (b), of (a-1) the first-order modified, hydrogenated copolymer of item 14 above, and
    99 to 1 part by weight, relative to 100 parts by weight of the total of components (a-1) and (b), of (b) at least one polymer selected from the group consisting of a thermoplastic resin other than the first-order modified, hydrogenated copolymer (a-1) and a rubbery polymer other than the first-order modified, hydrogenated copolymer (a-1).
20. The first-order modified, hydrogenated copolymer composition according to item 19 above, which is a foam.
21. A crosslinked, first-order modified, hydrogenated copolymer composition obtained by subjecting the first-order modified, hydrogenated copolymer composition of item 19 above to a crosslinking reaction in the presence of a crosslinking agent.
22. An adhesive composition comprising:
    100 parts by weight of the first-order modified, hydrogenated copolymer (a-1) of item 14 above, and
    20 to 400 parts by weight of a tackifier (n).
23. An asphalt composition comprising:
    0.5 to 50 parts by weight of the first-order modified, hydrogenated copolymer (a-1) of item 14 above, and
    100 parts by weight of an asphalt (o).
24. A second-order modified, hydrogenated copolymer obtained by reacting the first-order modified, hydrogenated copolymer of item 14 above with a second-order modifier, wherein the second-order modifier has a functional group which is reactive to the functional group of the first-order modifier group of the first-order modified, hydrogenated copolymer.
25. The second-order modified, hydrogenated copolymer according to item 24 above, wherein the functional group of said second-order modifier comprises at least one member selected from the group consisting of a hydroxyl group, a carboxyl group, an acid anhydride group, an isocyanate group, an epoxy group, a silanol group and an alkoxysilane group.
26. The second-order modified, hydrogenated copolymer according to item 24 above, which is a foam.
27. A crosslinked, second-order modified, hydrogenated copolymer obtained by subjecting the second-order modified, hydrogenated copolymer of item 24 above to a crosslinking reaction in the presence of a crosslinking agent.
28. A second-order modified, hydrogenated copolymer composition comprising:
    1 to 99 parts by weight, relative to 100 parts by weight of the total of components (a-2) and (b), of (a-2) the second-order modified, hydrogenated copolymer of item 24 above, and
    99 to 1 part by weight, relative to 100 parts by weight of the total of components (a-2) and (b), of (b) at least one polymer selected from the group consisting of a thermoplastic resin other than the second-order modified, hydrogenated copolymer (a-2) and a rubbery polymer other than the second-order modified, hydrogenated copolymer (a-2).
29. The second-order modified, hydrogenated copolymer composition according to item 28 above, which is a foam.
30. A crosslinked, second-order modified, hydrogenated copolymer composition obtained by subjecting the second-order modified, hydrogenated copolymer composition of item 28 above to a crosslinking reaction in the presence of a crosslinking agent.
31. An adhesive composition comprising:
    100 parts by weight of the second-order modified, hydrogenated copolymer (a-2) of item 24 above, and
    20 to 400 parts by weight of a tackifier (n).
32. An asphalt composition comprising:
    0.5 to 50 parts by weight of the second-order modified, hydrogenated copolymer (a-2) of item 24 above, and
    100 parts by weight of an asphalt (o).

Hereinbelow, the present invention is described in detail.

In the present invention, the monomer units of the polymer are named in accordance with a nomenclature wherein the names of the original monomers from which the monomer units are derived are used with the term "monomer unit" attached thereto. For example, the term "vinyl aromatic monomer unit" means a monomer unit which is formed in a polymer obtained by the polymerization of the vinyl aromatic monomer. The vinyl aromatic monomer unit has a molecular structure wherein the two carbon atoms of a substituted ethylene group derived from a substituted vinyl group respectively form linkages to adjacent vinyl aromatic monomer units. Similarly, the term "conjugated diene monomer unit" means a monomer unit which is formed in a polymer obtained by the polymerization of the conjugated diene monomer. The conjugated diene monomer unit has a molecular structure wherein the two carbon atoms of an olefin corresponding to the conjugated diene monomer respectively form linkages to adjacent conjugated diene monomer units.

The hydrogenated copolymer of the present invention is obtained by hydrogenating an unhydrogenated copolymer comprising conjugated diene monomer units and vinyl aromatic monomer units (hereinafter, this unhydrogenated copolymer is frequently referred to as "base unhydrogenated copolymer"). The hydrogenated copolymer of the present invention comprises:

at least one polymer block selected from the group consisting of a polymer block (A) of vinyl aromatic monomer units, and a hydrogenated polymer block (C) which is obtained by hydrogenating an unhydrogenated polymer block of conjugated diene monomer units, wherein the unhydrogenated polymer block of conjugated diene monomer units has a vinyl bond content of less than 30%, and at least one hydrogenated copolymer block (B) which is obtained by hydrogenating an unhydrogenated random copolymer block comprised of conjugated diene monomer units and vinyl aromatic monomer units.

Each of the polymer block (A) and the hydrogenated polymer block (C) performs a function similar to a physical crosslinking point, and is called a "hard segment". On the other hand, the hydrogenated copolymer block (B) is called a "soft segment".

It is preferred that the hydrogenated copolymer of the present invention contains at least two polymer blocks which are hard segments. When the hydrogenated copolymer of the present invention contains no hydrogenated polymer block (C), it is required that the hydrogenated copolymer contain at least two polymer blocks (A). When the hydrogenated copolymer of the present invention contains at least two polymer blocks which are hard segments, the hydrogenated copolymer exhibits excellent tensile elongation at break. Specifically, in such case, for example, the tensile elongation at break of the hydrogenated copolymer is generally 100% or more, preferably 200% or more, more preferably 300% or more, as measured at a pulling rate of 200 mm/min.

When the hydrogenated copolymer of the present invention contains a hydrogenated polymer block (C), the hydrogenated copolymer has excellent crosslinkability.

When the hydrogenated copolymer of the present invention contains no hydrogenated polymer block (C), it is required that substantially no crystallization peak ascribed to the at least one hydrogenated copolymer block (B) be observed at −20 to 80° C. in a differential scanning calorimetry (DSC) chart obtained with respect to the hydrogenated copolymer. In the present invention, "substantially no crystallization peak is observed at −20 to 80° C." means that no peak indicating the occurrence of crystallization (i.e., crystallization peak) is observed within the above-mentioned temperature range, or that a crystallization peak is observed within the above-mentioned temperature range, but the quantity of heat at the crystallization peak is less than 3 J/g, preferably less than 2 J/g, more preferably less than 1 J/g, still more preferably zero.

When the hydrogenated copolymer of the present invention contains a hydrogenated polymer block (C), the hydrogenated copolymer need not satisfy the above-mentioned requirement that substantially no crystallization peak ascribed to the at least one hydrogenated copolymer block (B) be observed at −20 to 80° C. in a DSC chart obtained with respect to the hydrogenated copolymer. However, even when the hydrogenated copolymer contains a hydrogenated polymer block (C), it is preferred that substantially no crystallization peak ascribed to the at least one hydrogenated copolymer block (B) is observed at −20 to 80° C. in a DSC chart obtained with respect to the hydrogenated copolymer.

When substantially no crystallization-peak ascribed to the at least one hydrogenated copolymer block (B) is observed at −20 to 80° C. in a DSC chart obtained with respect to the hydrogenated copolymer, the hydrogenated copolymer has excellent flexibility and, hence, is suitable for use as a substitute for a flexible vinyl chloride resin. The above-mentioned hydrogenated copolymer which is characterized in that substantially no crystallization peak ascribed to the at least one hydrogenated copolymer block (B) is observed at −20 to 80° C. in a DSC chart obtained with respect to the hydrogenated copolymer, can be obtained by hydrogenating an unhydrogenated copolymer which is obtained by a polymerization reaction performed under the below-described conditions in the presence of the below-described vinyl bond formation-controlling agent and/or an agent for controlling the occurrence of a random copolymerization of a conjugated diene and a vinyl aromatic compound.

When the hydrogenated copolymer of the present invention contains a hydrogenated polymer block (C), it is preferred that, in a DSC chart obtained with respect to the hydrogenated copolymer, a crystallization peak ascribed to the hydrogenated polymer block (C) is observed at a temperature of 30° C. or more, more advantageously from 45 to 100° C., still more advantageously from 50 to 90° C. It is preferred that the quantity of heat at the crystallization peak is 3 J/g or more, more advantageously 6 J/g or more, still more advantageously 10 J/g or more.

The crystallization peak temperature and the quantity of heat at the crystallization peak temperature can be measured by means of a differential scanning calorimetry (DSC) apparatus.

The hydrogenated copolymer of the present invention has a content of the vinyl aromatic monomer units of from more than 40% by weight to less than 95% by weight, based on the weight of the hydrogenated copolymer. By virtue of this characteristic, the hydrogenated copolymer of the present invention has excellent properties with respect to flexibility, abrasion resistance and anti-impact scratch property. From the viewpoint of the flexibility, abrasion resistance and anti-impact scratch property of the hydrogenated copolymer, the content of the vinyl aromatic monomer units in the hydrogenated copolymer is preferably from 44% by weight to less than 90% by weight, more preferably from 48 to 88% by weight, based on the weight of the hydrogenated copolymer. When the hydrogenated copolymer contains no hydrogenated polymer block (C), the content of the vinyl aromatic monomer units in the hydrogenated copolymer is preferably from more than 50% by weight to less than 95% by weight, more preferably from more than 55% by weight to less than 92% by weight, still more preferably from more than 60% by weight to less than 88% by weight, still more preferably from 62 to 85% by weight, based on the weight of the hydrogenated copolymer. On the other hand, when the hydrogenated copolymer contains a hydrogenated polymer block (C), the content of the vinyl aromatic monomer units in the hydrogenated copolymer is preferably from more than 40% by weight to less than 90% by weight, more preferably from 44 to 85% by weight, still more preferably from 48 to 80% by weight, still more preferably from 50 to 70% by weight, based on the weight of the hydrogenated copolymer.

The content of the vinyl aromatic monomer units in the hydrogenated copolymer is approximately equal to the content of the vinyl aromatic monomer units in the base unhydrogenated copolymer. Therefore, the content of the vinyl aromatic monomer units in the base unhydrogenated copolymer is used as the content of the ylnyl aromatic monomer units in the hydrogenated copolymer. The content of the vinyl aromatic monomer units in the base unhydrogenated copolymer is measured by means of an ultraviolet spectrophotometer.

The hydrogenated copolymer of the present invention has a content of the polymer block (A) of 0 to 60% by weight, based on the weight of the hydrogenated copolymer. By virtue of this characteristic, the hydrogenated copolymer of the present invention has excellent flexibility. From the viewpoint of the heat resistance of the hydrogenated copolymer, the content of the polymer block (A) in the hydrogenated copolymer is preferably from 5 to 60% by weight, more preferably from 8 to 50% by weight, still more preferably from 10 to 40% by weight, still more preferably from 12 to 35% by weight, based on the weight of the hydrogenated copolymer. On the other hand, from the viewpoint of the flexibility and handling property (anti-blocking property) of the hydrogenated copolymer, the content of the polymer block (A) in the hydrogenated copolymer is preferably from 0 to 40% by weight, more preferably from 1 to 40% by weight, still more preferably from 5 to 35% by weight, still more preferably from 10 to 30% by weight, based on the weight of the hydrogenated copolymer. Herein, the "anti-blocking property" means a resistance to adhesion phenomena (which are generally referred to as "blocking") wherein when, for example, stacked resin shaped articles or a rolled resin film (which have or has resin surfaces which are in contact with each other) are or is stored for a long period of time, strong adhesion disadvantageously occurs between the resin surfaces, so that it becomes difficult to separate the resin surfaces from each other. Further, from the viewpoint of the crosslinkability of the hydrogenated copolymer, it is preferred that the content of the polymer block (A) in the hydrogenated copolymer is less than 5% by weight, more advantageously less than 2% by weight, based on the weight of the hydrogenated copolymer.

The content of the polymer block (A) (vinyl aromatic polymer block) in the hydrogenated copolymer is approximately equal to the content of the polymer block (A) in the base unhydrogenated copolymer. Therefore, the content of the polymer block (A) in the base unhydrogenated copolymer is used as the content of the polymer block (A) in the hydrogenated copolymer. The content of the polymer block (A) in the base unhydrogenated copolymer can be measured by the following method. The weight of the polymer block (A) is obtained by a method in which the base unhydrogenated copolymer is subjected to oxidative degradation in the presence of osmium tetraoxide as a catalyst using tert-butyl hydroperoxide (i.e., the method described in I. M. KOLTHOFF, et al., J. Polym. Sci. vol. 1, p. 429 (1946)) (hereinafter frequently referred to as "osmium tetraoxide degradation method"). Using the obtained weight of the polymer block (A), the content of the polymer block (A) in the base unhydrogenated copolymer is calculated by the below-mentioned formula, with the proviso that, among the polymer chains (formed by the oxidative degradation) corresponding to vinyl aromatic polymer blocks, the polymer chains having a polymerization degree of about 30 or less are not taken into consideration in the measurement of the content of the polymer block (A).

Content of the vinyl aromatic polymer block($A$)(% by weight)={(weight of the vinyl aromatic polymer block($A$) in the base unhydrogenated copolymer)/(total weight of the vinyl aromatic monomer units in the base unhydrogenated copolymer)}×100.

Also, the content of the polymer block (A) in the hydrogenated copolymer can be obtained by a method in which the hydrogenated copolymer is directly analyzed by means of a nuclear magnetic resonance (NMR) apparatus (see Y. Tanaka et al., "RUBBER CHEMISTRY and TECHNOLOGY, vol. 54, p. 685 (1981)) (hereinafter, this method is frequently referred to as "NMR method").

There is a correlation between the value of the content of the polymer block (A) obtained by the osmium tetraoxide degradation method (hereinafter, this value is referred to as an "Os value") and the value of the content of the polymer block (A) obtained by the NMR method (hereinafter, this value is frequently referred to as an "Ns value"). More specifically, as a result of the studies by the present inventors made with respect to various copolymers having different contents of vinyl aromatic polymer block (A), it has been found that the above-mentioned correlation is represented by the following formula:

$$Os\ value = -0.012(Ns\ value)^2 + 1.8(Ns\ value) - 13.0$$

In the present invention, when the Ns value is obtained by the NMR method, the obtained Ns value is converted into the Os value, utilizing the above-mentioned formula representing the correlationship between the Os value and the Ns value.

With respect to the content of the hydrogenated copolymer block (B) in the hydrogenated copolymer, there is no particular limitation. However, when the hydrogenated copolymer contains no hydrogenated polymer block (C), from the viewpoint of the scratch resistance of the hydrogenated copolymer, it is preferred that the content of the hydrogenated copolymer block (B) in the hydrogenated copolymer is from 30 to 95% by weight, more advantageously from 40 to 92% by weight, still more advantageously from 50 to 90% by weight, based on the weight of the hydrogenated copolymer. On the other hand, when the hydrogenated copolymer contains a hydrogenated polymer block (C), it is preferred that the content of the hydrogenated copolymer block (B) in the hydrogenated copolymer is from 30 to 90% by weight, more advantageously from 40 to 88% by weight, still more advantageously from 50 to 86% by weight, based on the weight of the hydrogenated copolymer.

As described above, the hydrogenated copolymer block (B) is obtained by hydrogenating an unhydrogenated random copolymer block comprised of conjugated diene monomer units and vinyl aromatic monomer units. The amount of the hydrogenated copolymer block (B) can be obtained from the amounts of conjugated diene monomer and vinyl aromatic monomer used for producing the unhydrogenated random copolymer block. The content of the hydrogenated copolymer block (B) in the hydrogenated copolymer is approximately equal to the content of the unhydrogenated random copolymer block in the base unhydrogenated copolymer. Therefore, the content of the unhydrogenated random copolymer block in the base unhydrogenated copolymer is used as the content of the hydrogenated copolymer block (B) in the hydrogenated copolymer.

With respect to the content of the hydrogenated polymer block (C) in the hydrogenated copolymer of the present invention, there is no particular limitation. However, from the viewpoint of the flexibility and abrasion resistance of the hydrogenated copolymer, the content of the hydrogenated polymer block (C) in the hydrogenated copolymer is preferably from 0 to 50% by weight, more preferably from 10 to 50% by weight, still more preferably from 12 to 45% by weight, still more preferably from 15 to 40% by weight, based on the weight of the hydrogenated copolymer.

As described above, the hydrogenated polymer block (C) is obtained by hydrogenating an unhydrogenated polymer block of conjugated diene monomer units. The amount of the hydrogenated polymer block (C) can be obtained from the amount of conjugated diene monomer used for producing the unhydrogenated polymer block. The content of the hydrogenated polymer block (C) in the hydrogenated copolymer is approximately equal to the content of the unhydrogenated polymer block (of conjugated diene monomer units) in the base unhydrogenated copolymer. Therefore, the content of the unhydrogenated polymer block (of conjugated diene monomer units) in the base unhydrogenated copolymer is used as the content of the hydrogenated polymer block (C) in the hydrogenated copolymer.

The hydrogenated copolymer of the present invention has a weight average molecular weight of from 30,000 to 1,000,000. By virtue of this characteristic, the hydrogenated copolymer of the present invention has a good balance of mechanical strength or scratch resistance and processability. From the viewpoint of the good balance of mechanical strength or scratch resistance and processability of the hydrogenated copolymer, it is preferred that the weight average molecular weight of the hydrogenated copolymer is from 50,000 to 800,000, more advantageously from 100,000 to 500,000, still more advantageously from 150,000 to 400,000. When the hydrogenated copolymer contains a hydrogenated polymer block (C), from the viewpoint of the processability of the hydrogenated copolymer, it is preferred that the weight average molecular weight of the hydrogenated copolymer is from more than 100,000 to 1,000,000, more advantageously from 120,000 to 800,000, still more advantageously from 140,000 to 500,000.

With respect to the molecular weight distribution (Mw/Mn) (i.e., the ratio of the weight average molecular weight (Mw) to the number average molecular weight (Mn)) of the hydrogenated copolymer of the present invention, it is preferred that the Mw/Mn is 10 or less, more advantageously from 1.05 to 8, still more advantageously from 1.1 to 5. When it is especially desired to achieve excellent processability, it is preferred that the Mw/Mn of the hydrogenated copolymer is from 1.3 to 5, more advantageously from 1.5 to 5, still more advantageously from 1.6 to 4.5, still more advantageously from 1.8 to 4.

The weight average molecular weight of the hydrogenated copolymer is approximately equal to that of the base unhydrogenated copolymer. Therefore, the weight average molecular weight of the base unhydrogenated copolymer is used as the weight average molecular weight of the hydrogenated copolymer. The weight average molecular weight of the base unhydrogenated copolymer is measured by gel permeation chromatography (GPC) using a calibration curve obtained with respect to commercially available standard monodisperse polystyrenes having predetermined molecular weights. The number average molecular weight of the hydrogenated copolymer can be obtained in the same manner as in the case of the weight average molecular weight of the base unhydrogenated copolymer. The molecular weight distribution of the hydrogenated copolymer is obtained, by calculation, as the ratio of the weight average molecular weight to the number average molecular weight.

As described above, the hydrogenated copolymer of the present invention is obtained by hydrogenating an unhydrogenated copolymer (i.e., the base unhydrogenated copolymer) comprising conjugated diene monomer units and vinyl aromatic monomer units. The hydrogenated copolymer has a hydrogenation ratio of 75 to 100%, as measured with respect to the double bonds in the conjugated diene monomer units. By virtue of this characteristic, the hydrogenated copolymer of the present invention has excellent properties with respect to abrasion resistance and handling property (anti-blocking property). From the viewpoint of the abrasion resistance and handling property (anti-blocking property) of the hydrogenated copolymer, it is preferred that the hydrogenation ratio of the hydrogenated copolymer as measured with respect to the double bonds in the conjugated diene monomer units is from 80 to 100%, more advantageously from 85 to 100%, still more advantageously from 90 to 100%.

With respect to the hydrogenation ratio of the hydrogenated copolymer as measured with respect to the vinyl aromatic monomer units, there is no particular limitation. However, the hydrogenation ratio of the hydrogenated copolymer as measured with respect to the vinyl aromatic monomer units is preferably from 50% or less, more preferably from 30% or less, still more preferably from 20% or less.

The above-mentioned hydrogenation ratios can be measured by means of a nuclear magnetic resonance apparatus.

In a dynamic viscoelastic spectrum obtained with respect to the hydrogenated copolymer of the present invention, at least one peak of loss tangent (tan $\delta$) is observed at −10 to 80° C., preferably at 0 to 70° C., more preferably at 5 to 50° C. In the dynamic viscoelastic spectrum, a peak of loss tangent which is observed at −10 to 80° C. is ascribed to the hydrogenated copolymer block (B) (i.e., a hydrogenated copolymer block which is obtained by hydrogenating an unhydrogenated random copolymer block comprised of conjugated diene monomer units and vinyl aromatic monomer units). The presence of at least one peak of loss tangent in the range of from −10 to 80° C. is essential for achieving a good balance of abrasion resistance and flexibility of the hydrogenated copolymer.

In a dynamic viscoelastic spectrum obtained with respect to the hydrogenated copolymer of the present invention, with respect to the presence or absence of a peak of loss tangent ascribed to the polymer block (A), there is no particular limitation. However, in general, a peak of loss tangent ascribed to the polymer block (A) is present at a temperature in the range of from more than 80° C. to 150° C.

The measurement of a peak of loss tangent (tan $\delta$) in a dynamic viscoelastic spectrum is measured at a frequency of 10 Hz by means of a dynamic viscoelastic spectrum analyzer.

As described above, the hydrogenated copolymer block (B) is obtained by hydrogenating an unhydrogenated random copolymer block comprised of conjugated diene monomer units and vinyl aromatic monomer units. With respect to the conjugated diene monomer unit/vinyl aromatic monomer unit weight ratio in the unhydrogenated random copolymer block, there is no particular limitation. However, in view of the above-mentioned requirement that at least one peak of loss tangent be observed at −10 to 80° C. in a dynamic viscoelastic spectrum obtained with respect to the hydrogenated copolymer, it is preferred that the conjugated diene monomer unit/vinyl aromatic monomer unit weight ratio in the unhydrogenated random copolymer block is from 45/55 to 10/90, more advantageously from 40/60 to 13/87, still more advantageously from 35/65 to 16/84.

As described above, the hydrogenated copolymer block (B) is obtained by hydrogenating an unhydrogenated random copolymer block comprised of conjugated diene monomer units and vinyl aromatic monomer units. With respect to the microstructure (i.e., the amounts of a cis bond, a trans bond, and a vinyl bond) of the conjugated diene monomer units in the unhydrogenated random copolymer block can be appropriately controlled by using the below-described polar compound and the like. When 1,3-butadiene is used as the conjugated diene monomer, the 1,2-vinyl bond content is preferably from 5 to 50%, more preferably from 10 to 40%. When isoprene or a combination of 1,3-butadiene and isoprene is used as the conjugated diene monomer, the total content of the 1,2-vinyl bond and 3,4-vinyl bond is preferably from 3 to 75%, more preferably from 5 to 60%. From the viewpoint of the abrasion resistance of the hydrogenated copolymer, the vinyl bond content is preferably from 5 to 35%, more preferably from 8 to 25%, still more preferably from 10 to 20%.

Hereinafter, the vinyl bond content means the total content of the 1,2-vinyl bond and 3,4-vinyl bond with the proviso that, when only 1,3-butadiene is used as the conjugated diene monomer, the vinyl bond content means the content of the 1,2-vinyl bond.

As described above, the hydrogenated polymer block (C) is obtained by hydrogenating an unhydrogenated polymer block of conjugated diene monomer units, wherein the unhydrogenated polymer block of conjugated diene monomer units has a vinyl bond content of less than 30%. From the viewpoint of the abrasion resistance, crosslinkability and handling property (anti-blocking property) of the hydrogenated copolymer, the vinyl bond content of the unhydrogenated polymer block is preferably from 8 to 25%, more preferably from 10 to 25%, still more preferably from 12 to 20%.

The vinyl bond content is measured with respect to the base unhydrogenated copolymer by means of an infrared spectrophotometer.

As described above, the hydrogenated copolymer of the present invention comprises at least one polymer block which is a hard segment and at least one copolymer block which is a soft segment. When the hydrogenated copolymer of the present invention contains at least two polymer blocks which are hard segments, the hydrogenated copolymer exhibits only a small tensile permanent set. The tensile permanent set of the hydrogenated copolymer is preferably 50% or less, more preferably 30% or less, still more preferably 25% or less, still more preferably 20% or less. The tensile permanent set of the hydrogenated copolymer is defined as follows. A sample specimen of the hydrogenated copolymer is subjected a tensile test in which the sample specimen is pulled until the sample specimen is broken. The elongation at break of the sample specimen, and the residual elongation of the sample specimen at a point in time of 24 hours after the breakage thereof are measured. The tensile permanent set is defined as a value (%) obtained by dividing the residual elongation by the elongation at break.

With respect to the structure of the hydrogenated copolymer of the present invention, there is no particular limitation. As an example of the hydrogenated copolymer of the present invention, there can be mentioned a hydrogenated copolymer comprising at least one hydrogenated polymer block (C), at least one hydrogenated copolymer block (B) and optionally at least one polymer block (A). Specific examples of such hydrogenated copolymers include those which have structures represented by the following formulae:

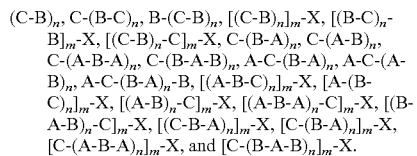

As another example of the hydrogenated copolymer of the present invention, there can be mentioned a hydrogenated copolymer comprising at least two polymer blocks (A) and at least one hydrogenated copolymer block (B). Specific examples of such hydrogenated copolymers include those which have structures represented by the following formulae:

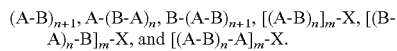

In the above-mentioned formulae, each A independently represents a polymer block of vinyl aromatic monomer units. Each B independently represents a hydrogenated copolymer block which is obtained by hydrogenating an unhydrogenated random copolymer block comprised of conjugated diene monomer units and vinyl aromatic monomer units. Each C independently represents a hydrogenated polymer block which is obtained by hydrogenating an unhydrogenated polymer block of conjugated diene monomer units, wherein the unhydrogenated polymer block of conjugated diene monomer units has a vinyl bond content of less than 30%. It is not necessary that the boundary between the polymer blocks be distinct. In each hydrogenated copolymer block B (which is obtained by hydrogenating an unhydrogenated random copolymer block comprised of conjugated diene monomer units and vinyl aromatic monomer units), the vinyl aromatic monomer units may be uniformly distributed or may be distributed in a tapered configuration. Further, each hydrogenated copolymer block B may have a plurality of segments in which the vinyl aromatic monomer units are uniformly distributed, and/or may have a plurality of segments in which the vinyl aromatic monomer units are distributed in a tapered configuration. Furthermore, each hydrogenated copolymer block B may have a plurality of segments having different vinyl aromatic monomer unit contents. In the above-mentioned formulae, each n is independently an integer of 1 or more, preferably an integer of from 1 to 5, and each m is independently an integer of 2 or more, preferably an integer of from 2 to 11. Each X independently represents a residue of a coupling agent or a residue of a multifunctional polymerization initiator. Examples of coupling agents include the below-mentioned bi- or more-functional coupling agents. Examples of multifunctional polymerization initiators include a reaction product of diisopropenylbenzene and sec-butyllithium, and a reaction product obtained by reacting divinylbenzene, sec-butyllithium and a small amount of 1,3-butadiene.

The hydrogenated copolymer of the present invention may be a mixture of a plurality of copolymers having structures selected from the group consisting of the structures represented by the above-mentioned formulae. The hydrogenated copolymer of the present invention may also be a mixture of a hydrogenated copolymer having a structure selected from the group consisting of the structures represented by the above-mentioned formulae, and at least one polymer selected from the group consisting of a polymer comprising vinyl aromatic monomer units, a copolymer having a structure represented by the formula: A-B, and a copolymer having a structure represented by the formula: B-A-B.

As described above, it is required that at least one peak of loss tangent (tan δ) be observed at a temperature in the range of from −10 to 80° C. in a dynamic viscoelastic spectrum obtained with respect to the hydrogenated copolymer of the present invention, wherein the peak of loss tangent observed in the above-mentioned temperature range is ascribed to the hydrogenated copolymer block (B) (which is obtained by hydrogenating an unhydrogenated random copolymer block comprised of conjugated diene monomer units and vinyl aromatic monomer units). In a temperature range outside the above-mentioned temperature range, a peak of loss tangent (tan δ) may be or may not be observed. For example, the hydrogenated copolymer of the present invention may have a polymer block which exhibits a peak of loss tangent at a temperature outside the range of from −10 to 80° C. Examples of such polymer blocks include a hydrogenated copolymer block obtained by hydrogenating an unhydrogenated copolymer block comprised of conjugated diene monomer units and vinyl aromatic monomer units, wherein the unhydrogenated copolymer block has a conjugated diene monomer unit content of 45% by weight or more; and a hydrogenated polymer block obtained by hydrogenating an unhydrogenated polymer block of conjugated diene monomer units, wherein the unhydrogenated polymer block has a vinyl bond content of 30% or more. When the hydrogenated copolymer contains at least one of these polymer blocks, it is recommended that substantially no crystallization peak is observed at −20 to 80° C. (preferably at −50 to 100° C.) in a differential scanning calorimetry (DSC) chart obtained with respect to the hydrogenated copolymer.

In the present invention, the conjugated diene monomer is a diolefin having a pair of conjugated double bonds. Examples of conjugated diene monomers include 1,3-butadiene, 2-methyl-1,3-butadiene (i.e., isoprene), 2,3-dimethyl-1,3-butadiene, 1,3-pentadiene, 2-methyl-1,3-pentadiene and 1,3-hexadiene. Of these conjugated diene monomers, preferred are 1,3-butadiene and isoprene. These conjugated diene monomers can be used individually or in combination.

Examples of vinyl aromatic monomers include styrene, α-methylstyrene, p-methylstyrene, divinylbenzene, 1,1-diphenylethylene, N,N-dimethyl-p-aminoethylstyrene and N,N-diethyl-p-aminoethylstyrene. These vinyl aromatic monomers can be used individually or in combination.

As described above, the hydrogenated copolymer of the present invention is obtained by hydrogenating an unhydrogenated copolymer comprising conjugated diene monomer units and vinyl aromatic monomer units. With respect to the method for producing the unhydrogenated copolymer, there is no particular limitation, and any conventional method can be employed. For example, the unhydrogenated copolymer can be produced by a living anionic polymerization performed in a hydrocarbon as a solvent in the presence of a polymerization initiator, such as an organic alkali metal compound. Examples of hydrocarbons as a solvent include aliphatic hydrocarbons, such as n-butane, isobutane, n-pentane, n-hexane, n-heptane and n-octane; alicyclic hydrocarbons, such as cyclohexane, cycloheptane and methylcycloheptane; and aromatic hydrocarbons, such as benzene, toluene, xylene and ethylbenzene.

Examples of polymerization initiators include aliphatic hydrocarbon-alkali metal compounds, aromatic hydrocarbon-alkali metal compounds, and organic amino-alkali metal compounds, which have a living anionic polymerization activity with respect to a conjugated diene monomer and a vinyl aromatic monomer. Examples of alkali metals include lithium, sodium and potassium. As preferred examples of organic alkali metal compounds, there can be mentioned lithium compounds (such as a monolithium compound, a dilithium compound, a trilithium compound and a tetralithium compound) having at least one lithium atom in a molecule of a $C_1$-$C_{20}$ aliphatic or aromatic hydrocarbons. Specific examples of lithium compounds include n-propyllithium, n-butyllithium, sec-butyllithium, tert-butyllithium, n-pentyllithium, n-hexyllithium, benzyllithium, phenyllithium, tolyllithium, a reaction product of diisopropenylbenzene and sec-butyllithium, and a reaction product obtained by reacting divinylbenzene, sec-butyllithium and a small amount of 1,3-butadiene. Further examples of lithium compounds include the organic alkali metal compounds described in U.S. Pat. No. 5,708,092, GB Patent No. 2,241,239 and U.S. Pat. No. 5,527,753.

In the present invention, when the copolymerization of a conjugated diene monomer and a vinyl aromatic monomer is performed in the presence of an organic alkali metal compound as a polymerization initiator, there may used a tertiary amine or an ether compound as a vinyl bond formation-controlling agent, which is used for controlling the amount of vinyl bonds (i.e., a 1,2-vinyl bond and a 3,4-vinyl bond) formed by the conjugated diene monomer, and/or for controlling the occurrence of a random copolymerization of the conjugated diene monomer and the vinyl aromatic monomer.

Examples of tertiary amines include a compound represented by the formula: $R^1R^2R^3N$, wherein each of $R^1$, $R^2$ and $R^3$ independently represents a $C_1$-$C_{20}$ hydrocarbon group or a $C_1$-$C_{20}$ hydrocarbon group substituted with a tertiary amino group. Specific examples of tertiary amines include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine and N,N'-dioctyl-p-phenylenediamine.

Examples of ether compounds include a linear ether compound and a cyclic ether compound. Examples of linear ether compounds include dimethyl ether; diethyl ether; diphenyl ether; ethylene glycol dialkyl ethers, such as ethylene glycol dimethyl ether, ethylene glycol diethyl ether and ethylene glycol dibutyl ether; and diethylene glycol dialkyl ethers, such as diethylene glycol dimethyl ether, diethylene glycol diethyl ether and diethylene glycol dibutyl ether. Examples of cyclic ether compounds include tetrahydrofuran, dioxane, 2,5-dimethyloxolane, 2,2,5,5-tetramethyloxolane, 2,2-bis(2-oxolanyl)propane and an alkyl ether of furfuryl alcohol.

In the present invention, the copolymerization of a conjugated diene monomer and a vinyl aromatic monomer in the presence of an organic alkali metal compound as a polymerization initiator can be performed either in a batchwise manner or in a continuous manner. Further, the copolymerization may be performed in a manner wherein a batchwise operation and a continuous operation are used in combination. From the viewpoint of adjusting the molecular weight distribution for achieving excellent processability, it is recommended that the copolymerization is performed in a continuous manner. The reaction temperature for the copolymerization is generally in the range of from 0 to 180° C., preferably from 30 to 150° C. The reaction time for the copolymerization varies depending on other conditions, but is generally within 48 hours, preferably in the range of from 0.1 to 10 hours. It is preferred that the atmosphere of the copolymerization reaction system is an atmosphere of an inert gas, such as nitrogen gas. With respect to the copolymerization reaction pressure, there is no particular limitation so long as the pressure is sufficient for the monomers and the solvent to maintain a liquid state at a reaction temperature in the above-mentioned range. Further, care must be taken so as to prevent the intrusion of impurities (such as water, oxygen and carbon dioxide), which deactivate the catalyst and/or the living polymer, into the copolymerization reaction system.

After completion of the copolymerization reaction, a coupling agent having a functionality of two or more may be added to the copolymerization reaction system to perform a coupling reaction. With respect to the coupling agent having a functionality of two or more, there is no particular limitation, and any of the conventional coupling agents can be used. Examples of bifunctional coupling agents include dihalides, such as dimethyldichlorosilane and dimethyldibromosilane; and acid esters, such as methyl benzoate, ethyl benzoate, phenyl benzoate and a phthalic ester. Examples of coupling agents having a functionality of three or more include polyhydric alcohols having three or more hydroxyl groups; multivalent epoxy compounds, such as epoxydized soy bean oil and diglycidyl bisphenol A; polyhalogenated compounds, such as a halogenated silicon compound represented by the formula: $R_{4-n}SiX_n$, wherein each R independently represents a $C_1$-$C_{20}$ hydrocarbon group, each X independently represents a halogen atom, and n is 3 or 4; and a halogenated tin compound represented by the formula: $R_{4-n}SnX_n$, wherein each R independently represents a $C_1$-$C_{20}$ hydrocarbon group, each X independently represents a halogen atom, and n is 3 or 4. Specific examples of halogenated silicon compounds include methylsilyl trichloride, t-butylsilyl trichloride, silicon tetrachloride and bromination products thereof. Specific examples of the halogenated tin compounds include methyltin trichloride, t-butyltin trichloride, and tin tetrachloride. Further, dimethyl carbonate, diethyl carbonate or the like can be used as a multifunctional coupling agent.

By hydrogenating the above-produced unhydrogenated copolymer in the presence of a hydrogenation catalyst, the hydrogenated copolymer of the present invention can be produced. With respect to the hydrogenation catalyst, there is no particular limitation, and any of the conventional hydrogenation catalysts can be used. Examples of hydrogenation catalysts include:
(1) a carried, heterogeneous hydrogenation catalyst comprising a carrier (such as carbon, silica, alumina or diatomaceous earth) having carried thereon a metal, such as Ni, Pt, Pd or Ru;
(2) the so-called Ziegler type hydrogenation catalyst which uses a transition metal salt (such as an organic acid salt or acetylacetone salt of a metal, such as Ni, Co, Fe or Cr) in combination with a reducing agent, such as an organoaluminum compound; and (3) a homogeneous hydrogenation catalyst, such as the so-called organometal complex, e.g., an organometal compound containing a metal, such as Ti, Ru, Rh or Zr.

Specific examples of hydrogenation catalysts include those which are described in Examined Japanese Patent Application Publication Nos. Sho 42-8704, Sho 43-6636, Sho 63-4841 (corresponding to U.S. Pat. No. 4,501,857), Hei 1-37970 (corresponding to U.S. Pat. No. 4,673,714), Hei 1-53851 and Hei 2-9041. As pre-ferred examples of hydrogenation catalysts, there can be mentioned a titanocene compound and a mixture of a titanocene compound and a reductive organometal compound.

Examples of titanocene compounds include those which are described in Unexamined Japanese Patent Application Laid-Open Specification No. Hei 8-109219. As specific examples of titanocene compounds, there can be mentioned compounds (e.g., biscyclopentadienyltitanium dichloride and monopentamethylcyclopentadienyltitanium trichloride) which have at least one ligand having a (substituted) cyclopentadienyl skeleton, an indenyl skeleton or a fluorenyl skeleton. Examples of reductive organometal compounds include organic alkali metal compounds, such as an organolithium compound; an organomagnesium compound; an organoaluminum compound; an organoboron compound; and an organozinc compound.

The hydrogenation reaction for producing the hydrogenated copolymer of the present invention is performed generally at 0 to 200° C., preferably at 30 to 150° C. The hydrogen pressure in the hydrogenation reaction is generally in the range of from 0.1 to 15 MPa, preferably from 0.2 to 10 MPa, more preferably from 0.3 to 5 MPa. The hydrogenation reaction time is generally in the range of from 3 minutes to 10 hours, preferably from 10 minutes to 5 hours. The hydrogenation reaction may be performed either in a batchwise manner or in a continuous manner. Further, the hydrogenation reaction may be performed in a manner wherein a batchwise operation and a continuous operation are used in combination.

By the method described hereinabove, the hydrogenated copolymer is obtained in the form of a solution thereof in a solvent. From the obtained solution, the hydrogenated copolymer is separated. If desired, before the separation of the hydrogenated copolymer, a catalyst residue may be separated from the solution. Examples of methods for separating the hydrogenated copolymer from the solution include a method in which a polar solvent (which is a poor solvent for the hydrogenated copolymer), such as acetone or an alcohol, is added to the solution containing the hydrogenated copolymer, thereby precipitating the hydrogenated copolymer, followed by recovery of the hydrogenated copolymer; a method in which the solution containing the hydrogenated copolymer is added to hot water while stirring, followed by removal of the solvent by steam stripping to recover the hydrogenated copolymer; and a method in which the solution containing the hydrogenated copolymer is directly heated to distill off the solvent.

The hydrogenated copolymer of the present invention may have incorporated therein at least one stabilizer. Examples of stabilizers include phenol type stabilizers, phosphorus type stabilizers, sulfur type stabilizers and amine type stabilizers.

With respect to the first-order modified, hydrogenated copolymer of the present invention, explanations are given below. The first-order modified, hydrogenated copolymer of the present invention comprises the hydrogenated copolymer of the present invention and a functional group-containing first-order modifier group bonded to the hydrogenated copolymer. The functional group-containing first-order modifier group is bonded to at least one of the terminals of the hydrogenated copolymer.

Examples of functional group-containing first-order modifier groups include modifier groups which have at least one functional group selected from the group consisting of a hydroxyl group, a carbonyl group, a thiocarbonyl group, an acid halide group, an acid anhydride group, a carboxyl group, a thiocarboxyl group, an aldehyde group, a thioaldehyde group, a carboxylic ester group, an amide group, a sulfonic acid group, a sulfonic ester group, a phosphoric acid group, a phosphoric ester group, an amino group, an imino group, a cyano group, a pyridyl group, a quinoline group, an epoxy group, a thioepoxy group, a sulfide group, an isocyanate group, an isothiocyanate group, a silicon halide group, a silanol group, an alkoxysilane group, a tin halide group, an alkoxy tin group and a phenyl tin group. Of the above-mentioned functional groups, preferred are a hydroxyl group, an epoxy group, an amino group, a silanol group and an alkoxysilane group.

As preferred examples of first-order modifier groups having at least one functional group selected from the group consisting of a hydroxyl group, an epoxy group, an amino group, a silanol group and an alkoxysilane group, there can be mentioned a modifier group having at least one functional group selected from the group consisting of the functional groups represented by the following formulae (1) to (14):

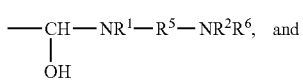

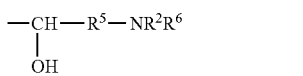

wherein, in the formulae (1) to (14):

N represents a nitrogen atom, Si represents a silicon atom, O represents an oxygen atom, C represents a carbon atom, and H represents a hydrogen atom, each of $R^1$ to $R^4$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group, each $R^5$ independently represents a $C_1$-$C_{48}$ hydrocarbon group which optionally has at least one functional group selected from the group consisting of a hydroxyl group, an epoxy group, an amino group, a silanol group and a $C_1$-$C_{24}$ alkoxysilane group, and each $R^6$ independently represents a hydrogen atom or a $C_1$-$C_8$ alkyl group.

As a modifier used for forming the above-mentioned first-order modifier group of the first-order modified, hydrogenated copolymer (hereinafter, this modifier is frequently referred to as "first-order modifier"), there can be mentioned a conventional compound which has or is capable of forming at least one of the above-mentioned functional groups. As examples of such compounds, there can be mentioned the terminal modifiers described in Examined Japanese Patent Application Publication No. Hei 4-39495 (corresponding to U.S. Pat. No. 5,115,035). Specific examples of modifiers are enumerated below.

Specific examples of modifiers having functional groups represented by the formulae (1) to (6) include tetraglycidyl-m-xylene-diamine, tetraglycidyl-1,3-bisaminomethylcyclohexane, tetraglycidyl-p-phenylenediamine, tetraglycidyl-diaminodiphenylmethane, diglycidylaniline, diglycidyl-o-toluidine, N-(1,3-dibutylbutylidene)-3-triethoxysilyl-1-propane-amine, 4-di(β-trimethoxysilylethyl)aminostyrene, 4-di(β-triethoxysilylethyl)aminostyrene, 4-di(γ-trimethoxysilylpropyl)aminostyrene, and 4-di(γ-triethoxysilylpropyl) aminostyrene.

Specific examples of modifiers having a functional group represented by the formula (7) include cyclic lactones, such as ε-caprolactone, δ-valerolactone, butyrolactone, γ-caprolactone and γ-valerolactone.

Specific examples of modifiers having a functional group represented by the formula (8) include 4-methoxybenzophenone, 4-ethoxybenzophenone, 4,4'-bis(methoxy)benzophenone, 4,4'-bis(ethoxy)benzophenone, γ-glycidoxyethyltrimethoxysilane and γ-glycidoxypropyltrimethoxysilane.

Specific examples of modifiers having functional groups represented by the formulae (9) and (10) include γ-glycidoxybutyltrimethoxysilane, γ-glycidoxypropyltriethoxysilane, γ-glycidoxypropyltripropoxysilane and γ-glycidoxypropyltributoxysilane.

Further specific examples of modifiers having functional groups represented by the formulae (9) and (10) include γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane and γ-glycidoxypropyldimethylethoxysilane.

Further specific examples of modifiers having functional groups represented by the formulae (9) and (10) also include γ-glycidoxypropyldimethylphenoxysilane, γ-glycidoxypropyldiethylmethoxysilane, γ-glycidoxypropylmethyldiisopropeneoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane and bis(γ-glycidoxypropyl)methylethoxysilane.

Further specific examples of modifiers having functional groups represented by the formulae (9) and (10) also include bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyltrimethoxysilane, γ-methacryloxypropyltriethoxysilane, γ-methacryloxymethyltrimethoxysilane, γ-methacryloxyethyltriethoxysilane, bis(γ-methacryloxypropyl)dimethoxysilane, tris(γ-methacryloxypropyl)methoxysilane, β-(3,4-epoxycyclohexyl)ethyl-trimethoxysilane and β-(3,4-epoxycyclohexyl)ethyl-triethoxysilane.

Further specific examples of modifiers having functional groups represented by the formulae (9) and (10) include: β-(3,4-epoxycyclohexyl)ethyl-tripropoxysilane, β-(3,4-epoxycyclohexyl)ethyl-tributoxysilane, β-(3,4-epoxycyclohexyl)ethyl-triphenoxysilane, β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane and β-(3,4-epoxycyclohexyl)ethyl-methyldibutoxysilane.

Further specific examples of modifiers having functional groups represented by the formulae (9) and (10) also include: β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, β-(3,4-epoxycyclohexyl)ethyl-dimethylpropoxysilane, β-(3,4-epoxycyclohexyl)ethyl-dimethylbutoxysilane, β-(3,4-epoxycyclohexyl)ethyl-dimethylphenoxysilane, β-(3,4-epoxycyclohexyl)ethyl-diethylmethoxysilane and β-(3,4-epoxycyclohexyl)ethyl-methyldiisopropeneoxysilane.

Specific examples of modifiers having a functional group represented by the formula (II) include 1,3-dimethyl-2-imidazolidinone and 1,3-diethyl-2-imidazolidinone.

Specific examples of modifiers having a functional group represented by the formula (12) include N,N'-dimethylpropyleneurea and N-methylpyrrolidone.

A first-order modified, hydrogenated copolymer having bonded thereto a modifier group which has a functional group represented by the formula (13) can be obtained by hydrogenating a modified, unhydrogenated copolymer which is obtained using a modifier having a functional group represented by the formula (11). A first-order modified, hydrogenated copolymer having bonded thereto a modifier group which has a functional group represented by the formula (14) can be obtained by hydrogenating a modified, unhydrogenated copolymer which is obtained using a modifier having a functional group represented by the formula (12).

The first-order modified, hydrogenated copolymer of the present invention can be produced by modifying the hydrogenated copolymer of the present invention. Alternatively, the first-order modified, hydrogenated copolymer of the present invention can be produced by modifying the base unhydrogenated copolymer, followed by hydrogenation.

For example, when the first-order modified, hydrogenated copolymer is produced by modifying the base unhydrogenated copolymer, followed by hydrogenation, the production of the first-order modified, hydrogenated copolymer is performed as follows. A base unhydrogenated copolymer having living terminals is produced by the above-mentioned method using an organolithium compound as a polymerization initiator. The living terminals of the base unhydrogenated copolymer are reacted with the above-mentioned first-order modifier to obtain a first-order modified, unhydrogenated copolymer, followed by hydrogenation, thereby obtaining the first-order modified, hydrogenated copolymer of the present invention.

As another method for producing the first-order modified, hydrogenated copolymer of the present invention, there can be mentioned a method in which a base unhydrogenated copolymer which does not have a living terminal is reacted with an organic alkali metal compound (such as an organolithium compound) (this reaction is called a "metalation reaction"), thereby obtaining a copolymer having bonded to the terminals thereof an alkali metal, followed by a reaction of the obtained copolymer with a first-order modifier. In this method, the base unhydrogenated copolymer may be hydrogenated before the metalation reaction and the subsequent reaction of the copolymer with a first-order modifier are performed.

When the base unhydrogenated copolymer is reacted with a first-order modifier, it is possible that a hydroxyl group, an amino group and the like, which are contained in the first-order modifier, are converted to organic metal salts thereof, depending on the type of first-order modifier. In such case, the organic metal salts can be reconverted to a hydroxyl group, an amino group and the like by reacting the organic metal salts with an active hydrogen-containing compound, such as water or an alcohol.

In either of the above-mentioned modification methods, the modification reaction temperature is preferably in the range of from 0 to 150° C., more preferably 20 to 120° C. The modification reaction time varies depending on other conditions, but is preferably within 24 hours, more preferably in the range of from 0.1 to 10 hours.

The first-order modified, hydrogenated copolymer of the present invention, which is obtained by a reaction of the living terminals of the base unhydrogenated copolymer with the first-order modifier, followed by hydrogenation, may contain an unmodified copolymer fraction. The amount of such unmodified copolymer fraction in the first-order modified, hydrogenated copolymer is preferably not more than 70% by weight, more preferably not more than 60% by weight, still more preferably not more than 50% by weight, based on the weight of the first-order modified, hydrogenated copolymer.

With respect to the second-order modified, hydrogenated copolymer of the present invention, explanations are given below. The second-order modified, hydrogenated copolymer of the present invention is obtained by reacting the first-order modified, hydrogenated copolymer of the present invention with a second-order modifier, wherein the second-order modifier has a functional group which is reactive to the functional group of the first-order modifier group of the first-order modified, hydrogenated copolymer.

As a preferred example of the functional group of the second-order modifier, there can be mentioned a functional group comprising at least one member selected from the group consisting of a carboxyl group, an acid anhydride group, an isocyanate group, an epoxy group, a silanol group and an alkoxysilane group. It is especially preferred that the functional group of the second-order modifier comprises at least two members selected from the group consisting of the above-mentioned functional groups, wherein, when the at least two members include an acid anhydride group, it is preferred that only one of the at least two members is an acid anhydride group.

When the first-order modified, hydrogenated copolymer is reacted with a second-order modifier, the amount of the second-order modifier is generally from 0.3 to 10 mol, preferably from 0.4 to 5 mol, more preferably from 0.5 to 4 mol, relative to one equivalent of the functional group of the first-order modifier group of the first-order modified, hydrogenated copolymer.

With respect to the method for reacting the first-order modified, hydrogenated copolymer with the second-order modifier, there is no particular limitation, and a conventional method can be employed. Examples of conventional methods include a method using melt-kneading (described below) and a method (described below) in which the components are reacted with each other in a state in which they are dissolved or dispersed together in a solvent. In the latter, there is no particular limitation with respect to the solvent so long as it is capable of dissolving or dispersing each of the components. Examples of solvents include hydrocarbons, such as an aliphatic hydrocarbon, an alicyclic hydrocarbon and an aromatic hydrocarbon; halogen-containing solvents; ester solvents; and ether solvents. In the method in which the components are dissolved or dispersed together in a solvent, the temperature at which the first-order modified, hydrogenated copolymer is reacted with the second-order modifier is generally from −10 to 150° C., preferably from 30 to 120° C. In this method, the reaction time varies depending on other conditions, but is generally within 3 hours, preferably in the range of from several seconds to 1 hour. As an especially preferred method for producing the second-order modified, hydrogenated copolymer, there can be mentioned a method in which the second-order modifier is added to a solution of the first-order modified, hydrogenated copolymer to thereby effect a reaction, thus obtaining a second-order modified, hydrogenated copolymer. In this method, the solution of the first-order modified, hydrogenated copolymer may be subjected to neutralization treatment before the addition of the second-order modifier to the solution of the first-order modified, hydrogenated copolymer.

Examples of second-order modifiers are enumerated below. Examples of second-order modifiers having a carboxyl group include aliphatic carboxylic acids, such as maleic acid, oxalic acid, succinic acid, adipic acid, azelaic acid, sebacic acid, dodecanedicarboxylic acid, carbalic acid, cyclohexanedicarboxylic acid and cyclopentanedicarboxylic acid; and aromatic carboxylic acids, such as terephthalic acid, isophthalic acid, o-phthalic acid, naphthalenedicarboxylic acid, biphenyldicarboxylic acid, trimesic acid, trimellitic acid and pyromellitic acid.

Examples of second-order modifiers having an acid anhydride group include maleic anhydride, itaconic anhydride, pyromellitic anhydride, cis-4-cyclohexane-1,2-dicarboxylic acid anhydride, 1,2,4,5-benzenetetracarboxylic acid dianhydride, and 5-(2,5-dioxytetrahydroxyfuryl)-3-methyl-3-cyclohexene-1,2-dicarboxylic acid anhydride.

Examples of second-order modifiers having an isocyanate group include toluoylene diisocyanate, diphenylmethane diisocyanate and multifunctional aromatic isocyanates.

Examples of second-order modifiers having an epoxy group include tetraglycidyl-1,3-bisaminomethylcyclohexane, tetraglycidyl-m-xylenediamine, diglycidylaniline, ethylene glycol diglycidyl, propylene glycol diglycidyl, terephthalic acid diglycidyl ester acrylate, and the above-mentioned epoxy compounds which are exemplified as first-order modifiers used for obtaining the first-order modified, hydrogenated copolymer.

Examples of second-order modifiers having a silanol group include hydrolysis products of the above-mentioned alkoxysilane compounds which are exemplified as first-order modifiers used for obtaining the first-order modified, hydrogenated copolymer.

Examples of second-order modifiers having an alkoxysilane group include bis-(3-triethoxysilylpropyl)-tetrasulfane, bis-(3-triethoxysilylpropyl)-disulfane, ethoxysiloxane oligomers, and the above-mentioned silane compounds which are exemplified as first-order modifiers used for obtaining the first-order modified, hydrogenated copolymer.

Especially preferred examples of second-order modifiers include a carboxylic acid having two or more carboxyl groups and an anhydride thereof; and crosslinking agents having two or more of a group selected from the group consisting of an acid anhydride group, an isocyanate group, an epoxy group, a silanol group and an alkoxysilane group. Specific examples of especially preferred second-order modifiers include maleic anhydride, pyromellitic anhydride, 1,2,4,5-benzenetetracarboxylic acid dianhydride, toluoylene diisocyanate, tetraglycidyl-1,3-bisaminomethylcyclohexane, and bis-(3-triethoxysilylpropyl)-tetrasulfane.

The hydrogenated copolymer (which is unmodified) of the present invention can be graft-modified using an α,β-unsaturated carboxylic acid or a derivative (such as an anhydride, an ester, an amide or an imide) thereof. Specific examples of α,β-unsaturated carboxylic acids and derivatives thereof include maleic anhydride, maleimide, acrylic acid, an acrylic ester, methacrylic acid, a methacrylic ester, and endo-cis-bicyclo(2,2,1)-5-heptene-2,3-dicarboxylic acid and an anhydride thereof.

The amount of the α,β-unsaturated carboxylic acid or derivative thereof is generally in the range of from 0.01 to 20 parts by weight, preferably from 0.1 to 10 parts by weight, relative to 100 parts by weight of the hydrogenated copolymer.

When the hydrogenated copolymer of the present invention is subjected to graft-modification, the graft-modification is performed preferably at 100 to 300° C., more preferably at 120 to 280° C.

With respect to the details of the method for the graft-modification, reference can be made, for example, to Unexamined Japanese Patent Application Laid-Open Specification No. Sho 62-79211.

An oligomer-modified, hydrogenated copolymer can be obtained by reacting the first- or second-order modified, hydrogenated copolymer of the present invention with a functional oligomer (having a functional group) which is reactive to the functional group of the first- or second-order modifier. With respect to the functional group of the functional oligomer, there is no particular limitation so long as it is reactive to the functional group of the first- or second-order modifier group of the first- or second-order modified, hydrogenated copolymer. Preferred examples of functional oligomers include those which have at least one functional group selected from the group consisting of a hydroxyl group, an amino group, a carboxyl group, an acid anhydride group, an isocyanate group, an epoxy group, a silanol group and an alkoxysilane group. The number average molecular weight of the functional oligomer is generally in the range of from 300 to less than 30,000, preferably from 500 to less than 15,000, more preferably from 1,000 to less than 20,000. With respect to the method for producing the functional oligomer, there is no particular limitation, and any conventional method can be employed. For example, the functional oligomer can be produced by anionic polymerization, cationic polymerization, radical polymerization, condensation polymerization or polyaddition.

Specific examples of functional oligomers include a butadiene oligomer having at least one of the above-mentioned functional groups, and a hydrogenation product thereof; an isoprene oligomer having at least one of the above-mentioned functional groups, and a hydrogenation product thereof; an ethylene oligomer having at least one of the above-mentioned functional groups; a propylene oligomer having at least one of the above-mentioned functional groups; an ethylene oxide oligomer; a propylene oxide oligomer; a co-oligomer of ethylene oxide and propylene oxide; a saponification product of a co-oligomer of ethylene and vinyl acetate; and a co-oligomer of a functional vinyl monomer (having at least one of the above-mentioned functional groups) and another functional vinyl monomer which is copolymerizable with the functional vinyl monomer.

By using the hydrogenated copolymer of the present invention (hereinafter frequently referred to as "component (a-0)"), the first-order modified, hydrogenated copolymer of the present invention (hereinafter frequently referred to as "component (a-1)") or the second-order modified, hydrogenated copolymer of the present invention (hereinafter frequently referred to as "component (a-2)") in combination with a polymer other than any of the components (a-0), (a-1) and (a-2), there can be obtained a composition which is suitable as a material for producing a shaped article. With respect to such composition, explanations are given below (hereinafter, the term "component (a)" is frequently used as a generic name of the components (a-0), (a-1) and (a-2)).

The hydrogenated copolymer composition of the present invention comprises:

1 to 99 parts by weight, relative to 100 parts by weight of the total of components (a-0) and (b), of the component (a-0) (i.e., the hydrogenated copolymer of the present invention), and 99 to 1 part by weight, relative to 100 parts by weight of the total of components (a-0) and (b), of (b) at least one polymer selected from the group consisting of a thermoplastic resin other than the hydrogenated copolymer (a-0) and a rubbery polymer other than the hydrogenated copolymer (a-0).

The first-order modified, hydrogenated copolymer composition of the present invention comprises:

1 to 99 parts by weight, relative to 100 parts by weight of the total of components (a-1) and (b), of the component (a-1) (i.e., the first-order modified, hydrogenated copolymer of the present invention), and 99 to 1 part by weight, relative to 100 parts by weight of the total of components (a-1) and (b), of (b) at least one polymer selected from the group consisting of a thermoplastic resin other than the first-order modified, hydrogenated copolymer (a-1) and a rubbery polymer other than the first-order modified, hydrogenated copolymer (a-1).

The second-order modified, hydrogenated copolymer composition of the present invention comprises:

1 to 99 parts by weight, relative to 100 parts by weight of the total of components (a-2) and (b), of the component (a-2) (i.e., the second-order modified, hydrogenated copolymer of the present invention), and 99 to 1 part by weight, relative to 100 parts by weight of the total of components (a-2) and (b), of (b) at least one polymer selected from the group consisting of a thermoplastic resin other than the second-order modified, hydrogenated copolymer (a-2) and a rubbery polymer other than the second-order modified, hydrogenated copolymer (a-2).

In each of the hydrogenated copolymer composition, the first-order modified, hydrogenated copolymer composition and the second-order modified, hydrogenated copolymer composition, the component (a)/component (b) weight ratio is preferably from 2/98 to 90/10, more preferably from 5/95 to 70/30.

When the component (b) is a thermoplastic resin, each of the hydrogenated copolymer composition, the first-order modified, hydrogenated copolymer composition and the second-order modified, hydrogenated copolymer composition has excellent mechanical properties and excellent abrasion resistance. On the other hand, when the component (b) is a rubbery polymer, each of the hydrogenated copolymer composition, the first-order modified, hydrogenated copolymer composition and the second-order modified, hydrogenated copolymer composition has excellent properties with respect to tensile strength, elongation and abrasion resistance.

Examples of thermoplastic resins usable as the component (b) include a block copolymer resin of a conjugated diene monomer and a vinyl aromatic monomer, and a hydrogenation product thereof (other than the hydrogenated copolymer of the present invention); a polymer of a vinyl aromatic monomer; a copolymer resin of a vinyl aromatic monomer with at least one vinyl monomer (other than the vinyl aromatic monomer), such as ethylene, propylene, butylene, vinyl chloride, vinylidene chloride, vinyl acetate, acrylic acid, an acrylic ester (e.g., methyl acrylate), methacrylic acid, a methacrylic ester (e.g., methyl methacrylate), acrylonitrile or methacrylonitrile; a rubber-modified styrene resin (HIPS); an acrylonitrile/butadiene/styrene copolymer resin (ABS); and a methacrylic ester/butadiene/styrene copolymer resin (MBS).

Further examples of thermoplastic resins usable as the component (b) include ethylene polymer resins, such as polyethylene, a copolymer of ethylene with a comonomer copolymerizable with ethylene (wherein the ethylene monomer unit content is 50% by weight or more) (e.g., an ethylene/propylene copolymer, an ethylene/butylene copolymer, an ethylene/hexene copolymer, an ethylene/octene copolymer, or an ethylene/vinyl acetate copolymer or a hydrolysis product thereof), an ethylene/acrylic acid ionomer and a chlorinated polyethylene; propylene polymer resins, such as polypropylene, a copolymer of propylene with a comonomer copolymerizable with propylene (wherein the propylene monomer unit content is 50% by weight or more) (e.g., a propylene/ethylene copolymer or a propylene/ethyl acrylate copolymer), and a chlorinated polypropylene; cyclic olefin type resins, such as an ethylene/norbornene resin; a butene polymer resin; a vinyl chloride polymer resin; and a vinyl acetate polymer resin and a hydrolysis product thereof.

Further examples of thermoplastic resins usable as the component (b) include a polymer of acrylic acid, and a polymer of an ester or amide thereof; an acrylate polymer resin; a polymer of acrylonitrile, a polymer of methacrylonitrile, and a copolymer of acrylonitrile with methacrylonitrile; a nitrile resin which is a copolymer of an acrylonitrile type monomer with a comonomer copolymerizable with the acrylonitrile type monomer (wherein the acrylonitrile type monomer unit content is 50% by weight or more); polyamide resins, such as nylon-46, nylon-6, nylon-66, nylon-610, nylon-11, nylon-12 and nylon-6/nylon-12 copolymer; a polyester resin; a thermoplastic polyurethane resin; polycarbonates, such as poly-4,4'-dioxydiphenyl-2,2'-propane carbonate; thermoplastic polysulfones, such as a polyether sulfone and a polyallyl sulfone; an oxymethylene polymer resin; polyphenylene ether resins, such as poly(2,6-dimethyl-1,4-phenylene) ether; polyphenylene sulfide resins, such as polyphenylene sulfide and poly-4,4'-diphenylene sulfide; a polyallylate resin; an ether ketone homopolymer or copolymer; a polyketone resin; a fluororesin; a polyoxybenzoyl type polymer; a polyimide resin; and butadiene polymer resins, such as 1,2-polybutadiene and transpolybutadiene.

Among these thermoplastic resins (b), preferred are styrene resins, such as polystyrene and a rubber-modified styrene resin; ethylene polymer resins, such as polyethylene, an ethylene/propylene copolymer, an ethylene/propylene/butylene copolymer, an ethylene/butylene copolymer, an ethylene/hexene copolymer, an ethylene/octene copolymer, an ethylene/vinyl acetate copolymer, an ethylene/acrylic ester copolymer and an ethylene/methacrylic ester copolymer; propylene polymer resins, such as polypropylene and a propylene/ethylene copolymer; a polyamide resin; a polyester resin; and a polycarbonate resin.

The number average molecular weight of the thermoplastic resin (b) used in the present invention is generally 1,000 or more, preferably from 5,000 to 5,000,000, more preferably from 10,000 to 1,000,000. The number average molecular weight of the thermoplastic resin (b) can be measured by GPC.

Examples of rubbery polymers usable as the component (b) include a butadiene rubber and a hydrogenation product thereof; a styrene/butadiene rubber and a hydrogenation product thereof (other than the hydrogenated copolymer of the present invention); an isoprene rubber; an acrylonitrile/butadiene rubber and a hydrogenation product thereof; 1,2-polybutadiene; olefin type elastomers, such as a chloroprene rubber, an ethylene/propylene rubber, an ethylene/propylene/diene rubber (EPDM), an ethylene/butene/diene rubber, an ethylene/butene rubber, an ethylene/hexene rubber and an ethylene/octene rubber; a butyl rubber; an acrylic rubber; a fluororubber; a silicone rubber; and a chlorinated polyethylene rubber.

Further examples of rubbery polymers usable as the component (b) include an epichlorohydrin rubber; an α,β-unsaturated nitrile/acrylic ester/conjugated diene copolymer rubber; a urethane rubber; a polysulfide rubber; styrene type elastomers (such as a styrene/butadiene block copolymer and a hydrogenation product thereof, and a styrene/isoprene block copolymer and a hydrogenation product thereof); and a natural rubber.

Among these rubber polymers (b), preferred are styrene type elastomers (such as a styrene/butadiene block copolymer and a hydrogenation product thereof, and a styrene/isoprene block copolymer and a hydrogenation product thereof); 1,2-polybutadiene; olefin type elastomers (e.g., an ethylene/butene rubber, an ethylene/octene rubber and an ethylene/propylene/diene rubber (EPDM)); and a butyl rubber.

Each of these rubbery polymers may be modified by introducing thereto a functional group, such as a carboxyl group, a carbonyl group, an acid anhydride group, a hydroxyl group, an epoxy group, an amino group, a silanol group or an alkoxysilane group.

The number average molecular weight of the rubbery polymer (b) used in the present invention is generally 10,000 or more, preferably from 20,000 to 1,000,000, more preferably from 30,000 to 800,000. The number average molecular weight of the rubbery polymer (b) can be measured by GPC.

Polymers as the component (b) can be used individually or in combination. With respect to the combination of polymers used as the component (b), there is no particular limitation. For example, a plurality of thermoplastic resins can be used in combination. Alternatively, a plurality of rubbery polymers can be used in combination. Further, at least one thermoplastic resin and at least one rubbery polymer can be used in combination.

In the case where the component (a) is the first-order modified, hydrogenated copolymer or the second-order modified, hydrogenated copolymer, when at least one polymer selected from the group consisting of a functional group-containing thermoplastic resin and a functional group-containing rubbery polymer is used as the component (b), the compatibility between the component (a) and the component (b) is remarkably improved. The functional group-containing thermoplastic resin and the functional group-containing rubbery polymer can be selected from the above-exemplified thermoplastic resins and rubbery polymers, respectively. Preferred examples of functional group-containing thermoplastic resins and functional group-containing rubbery polymers include functional group-containing ethylene polymers, functional group-containing propylene polymer resins, polyester resins, polyamide resins, polycarbonate resins and polyurethane resins.

As an example of a composition comprising the first-order modified, hydrogenated copolymer (i.e., component (a-1)), the component (b) and the second-order modifier, there can be mentioned a composition comprising:

1 to 99 parts by weight, preferably 2 to 90 parts by weight, more preferably 5 to 70 parts by weight, relative to 100 parts by weight of the total of components (a-1) and (b), of component (a-1), 99 to 1 part by weight, preferably 98 to 10 parts by weight, more preferably 95 to 30 parts by weight, relative to 100 parts by weight of the total of components (a-1) and (b), of component (b), and 0.01 to 20 parts by weight, preferably 0.02 to 10 parts by weight, more preferably 0.05 to 7 parts by weight, relative to 100 parts by weight of the total of components (a-1) and (b), of the second-order modifier.

When the component (b) is a thermoplastic resin, the component (a-1)/component (b) weight ratio is preferably from 2/98 to 90/10, more preferably from 5/95 to 60/40, still more preferably from 10/90 to 40/60.

If desired, each of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention may contain at least one additive. With respect to the additive, there is no particular limitation so long as it is conventionally used in thermoplastic resins or rubbery polymers.

Examples of additives include those which are described in "Gomu Purasuchikku Haigou Yakuhin (Additives for Rubber and Plastic)" (Rubber Digest Co., Ltd., Japan). Specific examples of additives include inorganic fillers, such as silica, calcium carbonate, magnesium carbonate, magnesium hydroxide, calcium sulfate, barium sulfate, talc, mica, silicic acid (white carbon) and titanium oxide; pigments, such as carbon black and iron oxide; lubricants, such as stearic acid, behenic acid, zinc stearate, calcium stearate, magnesium stearate and ethylene bis-stearamide; mold release agents; plasticizers, such as an organopolysiloxane and a mineral oil; antioxidants, such as a hindered phenol type antioxidant and a phosphorus type thermal stabilizer; hindered amine type light stabilizers; benzotriazole type ultraviolet absorbers; flame retardants; antistatic agents; reinforcing agents, such as an organic fiber, a glass fiber, a carbon fiber and a metal whisker; and coloring agents. These additives can be used individually or in combination.

With respect to any of the hydrogenated copolymer composition of the present invention, the first-order modified, hydrogenated copolymer composition of the present invention, and the second-order modified, hydrogenated copolymer composition of the present invention, the method for producing the copolymer composition is not particularly limited, and any of the conventional methods can be employed. For example, the copolymer composition can be produced by a melt-kneading method using a conventional mixing machine, such as a Banbury mixer, a single-screw extruder, a twin-screw extruder, a Ko-kneader or a multi-screw extruder. Alternatively, the copolymer composition can be produced by a method in which the components for the copolymer composition are added to a solvent, thereby obtaining a solution or dispersion of a mixture of the components in the solvent, followed by heating to remove the solvent. From the viewpoint of the productivity of the copolymer composition and the viewpoint of the uniform mixing of the components of the copolymer composition, it is preferred to use the melt-kneading method using an extruder. With respect to the form of each of the hydrogenated copolymer composition of the present invention, the first-order modified, hydrogenated copolymer composition of the present invention, and the second-order modified, hydrogenated copolymer composition of the present invention, there is no particular limitation. For example, the copolymer composition may be in the form of pellets, a sheet, a strand or a chip. Further, after the melt-kneading, the resultant molten copolymer composition can be directly formed into a shaped article.

The hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention can be used in various fields. For example, each of these copolymers and copolymer compositions is suitable for use in or as (i) a reinforcing filler-containing composition, (ii) a crosslink product, (iii) a foam, (iv) a shaped article, such as a multilayer film or a multilayer sheet, (v) a building material, (vi) a vibration damping, soundproofing material, (vii) an electric wire coating material, (viii) an adhesive composition, and (ix) an asphalt composition. Especially, the each of the copolymers and copolymer compositions can be advantageously used in or as the crosslink product of item (ii) above, the foam of item (iii) above, the building material of item (v) above, the vibration damping, soundproofing material of item (vi) above, and the electric wire coating material of item (vii) above. Hereinbelow, explanations are given with respect to the above-mentioned uses of the polymers and copolymer compositions. (As mentioned above, the term "component (a)" is frequently used as a generic name of the hydrogenated copolymer, the first-order modified, hydrogenated copolymer, and the second-order modified, hydrogenated copolymer. Also, hereinafter, the term "component (A)" is frequently used as a generic name of the hydrogenated copolymer composition, the first-order modified, hydrogenated copolymer composition, and the second-order modified, hydrogenated copolymer composition.

(i) Reinforcing Filler-Containing Composition

The reinforcing filler-containing composition can be produced by mixing any of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention with at least one reinforcing filler (which is hereinafter frequently referred to as "component (c)") selected from the group consisting of a silica type inorganic filler, a metal oxide, a metal hydroxide, a metal carbonate and carbon black. The amount of the component (c) in the reinforcing filler-containing composition is from 0.5 to 100 parts by weight, preferably from 5 to 100 parts by weight, more preferably from 20 to 80 parts by weight, relative to 100 parts by weight of the component (a) or (A). The amount of the component (b) in the reinforcing filler-containing composition is preferably from 0 to 500 parts by weight, more preferably from 5 to 300 parts by weight, still more preferably from 10 to 200 parts by weight, relative to 100 parts by weight of the component (a).

The silica type inorganic filler used as the reinforcing filler is a solid particle comprised mainly of $SiO_2$. Examples of silica type inorganic fillers include silica, clay, talc, kaolin, mica, wollastonite, montmorillonite, zeolite and a fibrous inorganic sub-stance (e.g., a glass fiber). Further, a silica type inorganic filler having its surface rendered hydrophobic and a mixture of the silica type inorganic filler and a non-silica type inorganic filler can also be used as the reinforcing filler. Among the above-exemplified silica type inorganic fillers, preferred are silica and a glass fiber. Specific examples of silica include a white carbon produced by the dry process, a white carbon produced by the wet process, a synthetic silicate type white carbon and the so-called colloidal silica. The average particle diameter of the silica type inorganic filler is preferably in the range of from 0.01 to 150 μm. From the viewpoint of dispersing the silica type inorganic filler finely in the composition so as to achieve the effects of addition of the filler, the average particle diameter of the silica type inorganic filler is more preferably in the range of from 0.05 to 1 μm, still more preferably from 0.05 to 0.5 μm.

The metal oxide used as the reinforcing filler is a solid particle comprised mainly of $M_xO_y$ (wherein M represents a metal atom, and each of x and y independently represents an integer of from 1 to 6). Examples of metal oxides include alumina, titanium oxide, magnesium oxide and zinc oxide. Further, the metal oxide may be used in the form of a mixture thereof with an inorganic filler other than a metal oxide.

The metal hydroxides used as the reinforcing filler are hydrated type inorganic fillers, such as aluminum hydroxide, magnesium hydroxide, zirconium hydroxide, hydrated aluminum silicate, hydrated magnesium silicate, basic magnesium carbonate, hydrotalcite, calcium hydroxide, barium hydroxide, hydrated tin oxide and hydrated inorganic metal compounds (e.g., borax). Of these metal hydroxides, preferred are magnesium hydroxide and aluminum hydroxide.

Examples of metal carbonates used as the reinforcing filler include calcium carbonate and magnesium carbonate.

Further, as the reinforcing filler, carbon blacks of various grades, such as FT, SRF, FEF, HAF, ISAF and SAF, can be used. It is preferred that the carbon black has a specific surface area (measured by the nitrogen adsorption method) of 50 mg/g or more, and a DBP (dibutyl phthalate) oil absorption of 80 ml/100 g or more.

The reinforcing filler-containing composition may contain a silane coupling agent (which is hereinafter frequently referred to as "component (d)"). The silane coupling agent is used for strengthening the interaction between the copolymer (i.e., the hydrogenated copolymer, the first-order modified, hydrogenated copolymer or the second-order modified, hydrogenated copolymer) and the reinforcing filler, and is a compound having a group which exhibits an affinity or bonding ability to at least one of the copolymer and the reinforcing filler. As a preferred example of the silane coupling agent, there can be mentioned a compound having a polysulfide linkage containing a silanol group or an alkoxysilane in combination with two or more sulfur atoms, wherein any of the sulfur atoms may be present in the form of a mercapto group. Specific examples of silane coupling agents include bis[3-(triethoxysilyl)propyl]tetrasulfide, bis[3-(triethoxysilyl)propyl]disulfide, bis[2-(triethoxysilyl)ethyl]tetrasulfide, 3-mercaptopropyl-trimethoxysilane, 3-triethoxysilylpropyl-N,N-dimethylthiocarbamoyltetrasulfide and 3-triethoxysilylpropylbenzothiazoletetrasulfide. From the viewpoint of obtaining the desired effect, the amount of the silane coupling agent is in the range of from 0.1 to 30% by weight, preferably from 0.5 to 20% by weight, more preferably from 1 to 15% by weight, based on the weight of the reinforcing filler.

The reinforcing filler-containing composition, which comprises the component (a) or (A) and a reinforcing filler, may be subjected to a crosslinking reaction in the presence of a crosslinking agent to produce a crosslinked composition. Examples of crosslinking agents include a radical generator (such as an organic peroxide or an azo compound), an oxime, a nitroso compound, a polyamine, sulfur, a sulfur-containing compound (such as sulfur monochloride, sulfur dichloride, a disulfide compound or a polymeric polysulfide compound). The amount of the crosslinking agent is generally from 0.01 to 20 parts by weight, preferably from 0.1 to 15 parts by weight, relative to 100 parts by weight of the component (a) or (A).

Examples of organic peroxides (hereinafter frequently referred to as "component (e)") used as the crosslinking agent, which are preferred from the viewpoint of low odor and scorch stability (i.e., a property such that a crosslinking reaction does not occur when the components for the composition are mixed with each other, but occurs rapidly when the resultant mixture is placed under conditions suitable for effecting a crosslinking reaction), include 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate and di-tert-butyl peroxide. Further examples of organic peroxides which can be used as the crosslinking agent include dicumyl peroxide, benzoyl peroxide, p-chlorobenzoyl peroxide, 2,4-dichlorobenzoyl peroxide, tert-butyl peroxybenzoate, tert-butylperoxyisopropyl carbonate, diacetyl peroxide, lauroyl peroxide and tert-butyl cumyl peroxide.

In the above-mentioned crosslinking reaction, a crosslinking accelerator (hereinafter frequently referred to as "component (f)") may be used in a desired amount. Examples of crosslinking accelerators include a sulphenic amide type accelerator, a guanidine type accelerator, a thiuram type accelerator, an aldehyde-amine type accelerator, an aldehyde-ammonia type accelerator, a thiazole type accelerator, a thiourea type accelerator and a dithiocarbamate type accelerator. Further, an auxiliary crosslinking agent, such as zinc white or stearic acid, may also be used in a desired amount.

Further, when the above-mentioned organic peroxide is used for crosslinking the reinforcing filler-containing composition, there can be used a crosslinking accelerator in combination with the organic peroxide. Examples of crosslinking accelerators which may be used in combination with the organic peroxide include sulfur; auxiliaries (hereinafter frequently referred to as "component (g)") for a peroxide crosslinking agent, such as p-quinone dioxime, p,p'-dibenzoylquinone dioxime, N-methyl-N-4-dinitrosoaniline, nitrosobenzene, diphenylguanidine and trimethylolpropane-N,N'-m-phenylene dimaleimide; divinylbenzene; triallyl cyanurate; multifunctional methacrylate monomers, such as ethylene glycol dimethacrylate, diethylene glycol dimethacrylate, polyethylene glycol dimethacrylate, trimethylol propane trimethacrylate and allyl methacrylate; multifunctional vinyl monomers (hereinafter frequently referred to as "component (h)"), such as vinyl butylate and vinyl stearate. The amount of the crosslinking accelerator as mentioned above is generally from 0.01 to 20 parts by weight, preferably from 0.1 to 15 parts by weight, relative to 100 parts by weight of the component (a) or (A).

The above-mentioned crosslinking reaction can be performed by a conventional method. For example, with respect to the crosslinking reaction temperature, the temperature is from 120 to 200° C., preferably from 140 to 180° C. The crosslinked reinforcing filler-containing composition has excellent properties with respect to heat resistance, flexibility and oil resistance.

For improving the processability of the reinforcing filler-containing composition, a rubber-softening agent (hereinafter frequently referred to as "component (i)") may be added. As the rubber-softening agent, it is preferred to use a mineral oil, or a liquid or low molecular weight synthetic softening agent. It is more preferred to use a naphthene type and/or paraffin type process oil or extender oil, which is generally used for softening a rubber, for increasing the volume of a rubber or for improving the processability of a rubber. The mineral oil type softening agent is a mixture of an aromatic compound, a naphthene and a chain paraffin. With respect to the mineral oil type softening agents, a softening agent in which the number of carbon atoms constituting the paraffin chains is 50% or more (based on the total number of carbon atoms present in the softening agent) is referred to as a "paraffin type softening agent"; a softening agent in which the number of carbon atoms constituting the naphthene rings is from 30 to 45% (based on the total number of carbon atoms present in the softening agent) is referred to as a "naphthene type softening agent"; and a softening agent in which the number of carbon atoms constituting the aromatic rings is more than 30% (based on the total number of carbon atoms present in the softening agent) is referred to as an "aromatic type softening agent". The reinforcing filler-containing composition may also contain a synthetic softening agent, such as a polybutene, a low molecular weight polybutadiene or a liquid paraffin. However, the above-mentioned mineral oil type softening agent is more preferred. The amount of the rubber-softening agent in the reinforcing filler-containing composition is in the range of from 0 to 100 parts by weight, preferably from 10 to 90 parts by weight, more preferably from 30 to 90 parts by weight, relative to 100 parts by weight of the component (a) or (A). When the amount of the rubber-softening agent exceeds 100 parts by weight, the rubber-softening agent is likely to bleed out from the composition, thereby leading to a danger that the surface tack of the composition occurs.

The reinforcing filler-containing composition, which comprises the component (a) or (A) and a reinforcing filler, can be used as a building material, an electric wire coating material, a vibration damping material and the like. Further, a crosslinked form of the reinforcing filler-containing composition can be used for producing a tire, a rubber cushion, a belt, an industrial article, footwear, a foam and the like, taking advantage of its characteristics.

(ii) Crosslink Product

The hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention can be crosslinked in the presence of a crosslinking agent to obtain crosslink products (i.e., a crosslinked hydrogenated copolymer, a crosslinked, first-order modified, hydrogenated copolymer, a crosslinked, second-order modified, hydrogenated copolymer, a crosslinked hydrogenated copolymer composition, a crosslinked, first-order modified, hydrogenated copolymer composition, and a crosslinked, second-order modified, hydrogenated copolymer composition, respectively). By crosslinking these copolymers and copolymer compositions, there can be improved the heat resistance (as evaluated in terms of high temperature C-Set (compression set)) and flexibility of the copolymers and copolymer compositions. In each of the above-mentioned crosslink products, the component (a)/component (b) weight ratio, i.e., the weight ratio of the component (a) (i.e., the hydrogenated copolymer, the first-order modified, hydrogenated copolymer, or the second-order modified, hydrogenated copolymer) to the component (b), is generally in the range of from 10/90 to 100/0, preferably from 20/80 to 90/10, more preferably from 30/70 to 80/20.

In the present invention, with respect to any of the copolymers and copolymer compositions, the crosslinking method therefor is not particularly limited. However, it is preferred to employ the so-called "dynamic crosslinking" method. In the dynamic crosslinking method, the components (including a crosslinking agent) for a desired crosslink product are melt-kneaded at a temperature at which a crosslinking reaction occurs, so as to effect the mixing of the components and the crosslinking reaction simultaneously. The details of this method are described in A. Y. Coran et al., Rub. Chem. and Technol. vol. 53, p. 141 (1980). In the dynamic crosslinking method, the crosslinking reaction is generally performed by using an enclosed kneader, such as a Banbury mixer or a pressurizing kneader, or a single-screw or twin-screw extruder. The kneading temperature is generally in the range of from 130 to 300° C., preferably from 150 to 250° C. The kneading time is generally in the range of from 1 to 30 minutes. Examples of crosslinking agents used in the dynamic crosslinking method include an organic peroxide and a phenol resin type crosslinking agent. The amount of the crosslinking agent is generally in the range of from 0.01 to 15 parts by weight, preferably from 0.04 to 10 parts by weight, relative to 100 parts by weight of the component (a) or (A).

As the organic peroxide used as the crosslinking agent in the dynamic crosslinking method, there can be used the above-mentioned component (e). When the crosslinking reaction is performed using the organic peroxide, the above-mentioned component (f) may be used as a crosslinking accelerator, wherein, if desired, the component (f) may be used in combination with the above-mentioned component (g) and/or the above-mentioned component (h). The amount of the crosslinking accelerator is generally in the range of from 0.01 to 20 parts by weight, preferably from 0.1 to 15 parts by weight, relative to 100 parts by weight of the component (a) or (A).

If desired, each of the crosslink products of the present invention may further contain an additive so long as the properties of the crosslink products are not adversely affected. Examples of additives include a softening agent, a thermal stabilizer, an antistatic agent, a weathering stabilizer, an antioxidant, a filler, a coloring agent and a lubricant. The above-mentioned component (i) can be used as a softening agent for adjusting the hardness and fluidity of the final product. The softening agent may be added just before or during the kneading of the components for the crosslink products, or may be incorporated into the copolymer (i.e., the hydrogenated copolymer, the first-order modified, hydrogenated copolymer, or the second-order modified, hydrogenated copolymer) during the production thereof so as to obtain the copolymer in the form of an oil extended rubber. The amount of the softening agent is generally in the range of from 0 to 200 parts by weight, preferably from 10 to 150 parts by weight, more preferably from 20 to 100 parts by weight, relative to 100 parts by weight of the component (a) or (A). The above-mentioned component (c) can be used as the filler in the crosslink products. The amount of the filler is generally in the range of from 0 to 200 parts by weight, preferably from 10 to 150 parts by weight, more preferably from 20 to 100 parts by weight, relative to 100 parts by weight of the component (a) or (A).

As in the case of the crosslinked form of the reinforcing filler-containing composition of item (i) above, the crosslink products of the present invention can be advantageously used for producing a tire, a rubber cushion, a belt, an industrial article, footwear, a foam and the like. Further, the crosslink products can also be advantageously used as materials for medical instruments and packaging materials for foods.

(iii) Foam

Each of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention can also be used in the form of a foam. Each of the foams of the present invention can be generally produced by a method in which a filler (which is hereinafter frequently referred to as "component (j)") is added to the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, or the second-order modified, hydrogenated copolymer composition of the present invention, to thereby produce a composition, followed by foaming. In the foam, the amount of the component (b) is generally in the range of from 5 to 95% by weight, preferably from 5 to 90% by weight, more preferably from 5 to 80% by weight, based on the weight of the component (a).

The amount of the filler (j) is generally in the range of from 5 to 95% by weight, preferably from 10 to 80% by weight, more preferably from 20 to 70% by weight, based on the weight of the foam.

Examples of fillers (j) used for producing the foams of the present invention include inorganic fillers, such as the above-mentioned reinforcing filler (component (c)), calcium sulfate, barium sulfate, potassium titanate whisker, mica, graphite and a carbon fiber; and organic fillers, such as a wood chip, a wood powder and a pulp. With respect to the form of the filler, there is no particular limitation. For example, the filler may be in the form of a scale, a sphere, a granule or a powder, or may have an irregular configuration. The above-mentioned fillers can be used individually or in combination. The filler may be treated with the above-mentioned silane coupling agent (component (d)) prior to use.

As foaming methods for obtaining each of the foams of the present invention, there can be mentioned a chemical method and a physical method. In each of these methods, cells are distributed throughout the composition by addition of a chemical foaming agent (such as an organic foaming agent or an inorganic foaming agent) or a physical foaming agent (hereinafter, both of the above-mentioned chemical and physical foaming agents are frequently referred to as "component (k)").

Each of the foams of the present invention can be advantageously used for producing a shaped article having a light weight, an improved flexibility, an improved design and the like. Examples of inorganic foaming agents include sodium bicarbonate, ammonium carbonate, ammonium bicarbonate, ammonium nitrite, an azide compound, sodium borohydride and a metal powder. Examples of organic foaming agents include azodicarbonamide, azobisformamide, azobisisobutylonitrile, barium azodicarboxylate, N,N'-dinitrosopentamethylenetetramine, N,N'-dinitroso-N,N'-dimethylterephtalamide, benzenesulfonylhydrazide, p-toluenesulfonylhydrazide, p,p'-oxybisbenzenesulfonylhydrazide and p-toluenesulfonylsemicarbazide. Examples of physical foaming agents include a hydrocarbon, such as pentane, butane or hexane; a halogenated hydrocarbon, such as methyl chloride or methylene chloride; a gas, such as nitrogen gas or air; and a fluorinated hydrocarbon, such as trichlorofluoromethane, dichlorodifluoromethane, trichlorotrifluoroethane, chlorodifluoroethane or a hydrofluorocarbon. The above-mentioned foaming agents can be used individually or in combination. The amount of the foaming agent is generally in the range of from 0.1 to 8 parts by weight, preferably from 0.3 to 6 parts by weight, more preferably from 0.5 to 5 parts by weight, relative to 100 parts by weight of the component (a) or (A).

If desired, each of the foams of the present invention may further contain an additive. With respect to the type of the additive, there is no particular limitation, and any additives which are conventionally used in thermoplastic resins or rubbery polymers can be used. Examples of additives include those which are described in the above-mentioned "Gomu Purasuchikku Haigou Yakuhin (Additives for Rubber and Plastic)" (Rubber Digest Co., Ltd., Japan).

Further, if desired, each of the foams of the present invention may be crosslinked. Examples of methods for crosslinking include a chemical crosslinking method by the addition of a crosslinking agent (such as a peroxide or sulfur) and optionally an auxiliary crosslinking agent; and a physical crosslinking method which utilizes an electron beam, a radiation or the like. The crosslinking may be performed either in a static manner in which the crosslinking reaction is caused by irradiation without stirring the crosslinking reaction system, or in a dynamic manner in which the crosslinking reaction system is stirred. Specifically, for example, the crosslinked foam can be produced as follows. A mixture of the copolymer or copolymer composition, a foaming agent and a crosslinking agent is shaped into a sheet. The sheet is heated at approximately 160° C. to cause foaming and crosslinking simultaneously, thereby obtaining a crosslinked foam. As the crosslinking agent, the above-mentioned component (e) (organic peroxide) and the above-mentioned component (f) (crosslinking accelerator) may be used. Further, the above-mentioned components (g) and (h) may also be used in combination with the crosslinking agent. The amount of the crosslinking agent is generally in the range of from 0.01 to 20 parts by weight, preferably from 0.1 to 15 parts by weight, relative to 100 parts by weight of the component (a) or (A).

Each of the foams of the present invention can be advantageously used as various shaped articles, such as a sheet and a film. Especially, the foam of the present invention can be advantageously used as a packaging material or container for foods (such as a packaging material for fruits or eggs, a meat tray or a lunch box), which is required to exhibit high flexibility. As an example of a foam used as a packaging material or container for foods, there can be mentioned a foam produced by foaming a composition comprising: an olefin resin (such as PP (polypropylene)); a vinyl aromatic polymer (such as PS (polystyrene)) or a rubber-modified styrene resin (such as HIPS); the component (a); and optionally a block copolymer (comprised of a conjugated diene monomer and a vinyl aromatic monomer) or a hydrogenation product thereof (other than the hydrogenated copolymer of the present invention).

Further, each of the foams of the present invention can be used in a cushioning hybrid article which comprises a hard resin shaped article in combination with the foam. Such cushioning hybrid article is produced by an injection molding method, such as an insert/mold cavity expansion method disclosed in Unexamined Japanese Patent Application Laid-Open Specification No. Hei 6-234133.

(iv) Multilayer Film and Multilayer Sheet

Each of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention can also be used for producing a multilayer film and a multilayer sheet. A film comprising any of the above-mentioned copolymers and copolymer compositions of the present invention has excellent properties with respect to heat resistance, shrinking property, heat sealability, transparency and fog resistance. By laminating a resin layer on the film, various additional properties can be imparted to the resultant multilayer film without sacrificing the above-mentioned excellent properties of the film. By such lamination, there can be obtained various forms of the multilayer films and sheets, which have excellent properties with respect to anti-blocking property, tear growth resistance, pierce resistance, mechanical strength (e.g., elongation at break), extensibility, roll property (i.e., a property such that a rolled film or sheet can be easily unrolled), elasticity recovery, pierce-induced tear resistance, tear resistance, distortion recovery and gas barrier properties.

In each of the multilayer films and multilayer sheets, the component (a)/component (b) weight ratio, i.e., the weight ratio of the component (a) (i.e., the hydrogenated copolymer, the first-order modified, hydrogenated copolymer, or the second-order modified, hydrogenated copolymer) to the component (b), is generally in the range of from 100/0 to 5/95, preferably from 100/0 to 20/80, more preferably from 100/0 to 40/60.

With respect to the use of any of the multilayer films and multilayer sheets, there is no particular limitation. For example, the multilayer film or multilayer sheet can be used for producing a wrapping film, a bag, a pouch and the like. In the case of a multilayer film having excellent stretch property, such a multilayer film can be advantageously used as a stretched film for wrapping foods, a palette stretched film, a protective film and the like. On the other hand, in the case of a multilayer film having excellent gas barrier properties, such a multilayer film can be advantageously used as a packaging for foods, beverages, precision machines, drugs and the like. Further, in the case of a heat shrinkable multilayer film, such a multilayer film can be advantageously used as a shrink wrap, a shrink label and the like.

(v) Building Material

Each of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention can also be used as a building material. It is preferred that each of the building materials of the present invention contains a filler and/or a flame retardant. The building materials of the present invention have excellent properties with respect to abrasion resistance, scratch resistance and tensile properties, and are suitable as a flooring material, a wall material, a ceiling material and a sealing material. Further, the building materials of the present invention can be used in the form of a foam.

In each of the building materials of the present invention, the component (a)/component (b) weight ratio, that is, the weight ratio of the component (a) (i.e., the hydrogenated copolymer, the first-order modified, hydrogenated copolymer, or the second-order modified, hydrogenated copolymer) to the component (b), is generally in the range of from 100/0 to 5/95, preferably from 95/5 to 10/90, more preferably from 95/5 to 20/80.

Examples of fillers used in the building material include those which are exemplified as component (j) in item (iii) above for the "foam".

Examples of flame retardants (hereinafter frequently referred to as "component (l)") used in the building material include: a halogen type flame retardant, such as a bromine-containing compound; a phosphorus type flame retardant, such as a phosphorus-containing aromatic compound; and an inorganic flame retardant, such as a metal hydroxide.

Examples of halogen type flame retardants include tetrabromoethane, octabromodiphenyl oxide, decabromodiphenyl oxide, hexabromocyclododecane, tribromoneopentyl alcohol, hexabromobenzene, decabromodiphenylethane, tris (tribromophenoxy)-S-triazine, tris(2,3-dibromopropyl)isocyanurate, bis(tribromophenoxy)ethane, ethyllenebis(tetrabromophthalimide), tetrabromobisphenol A, a tetrabromobisphenol A/carbonate oligomer, a tetrabromobisphenol A/bisphenol A oligomer, tetrabromobisphenol S, a chlorinated polyethylene, tetrabromophtahalic anhydride, and tetrachlorophthalic anhydride.

However, in the present invention, it is preferred to use a flame retardant which contains substantially no halogen. Specific examples of such flame retardants include phosphorus type flame retardants, such as triphenyl phosphate, tricresyl phosphate, trixylenyl phosphate, cresyldiphenyl phosphate, xylenyldiphenyl phosphate, resorcinol-bis(diphenyl phosphate), 2-ethylhexyldiphenyl phosphate, dimethylmethyl phosphate, triallyl phosphate, condensation products of these phosphates, ammonium phosphate and a condensation product thereof, and diethyl N,N-bis(2-hydroxyethyl)aminomethyl phosphonate; magnesium hydroxide; aluminum hydroxide; zinc borate; barium borate; kaolin-clay; calcium carbonate; alunite; basic magnesium carbonate; calcium hydroxide; red phosphorus; a guanidine compound; a melamine compound; antimony trioxide; antimony pentaoxide; sodium antimonate and a silicone resin.

In recent years, from the viewpoint of avoiding environmental problems, inorganic flame retardants are mainly used as the flame retardant. Representative examples of preferred inorganic flame retardants include water-containing metal compounds, such as metal hydroxides (e.g., magnesium hydroxide, aluminum hydroxide and calcium hydroxide), metal oxides (e.g., zinc borate and barium borate), calcium carbonate, a clay, basic magnesium carbonate and hydrotalcite. Among the above-exemplified inorganic flame retardants, a metal hydroxide (such as magnesium hydroxide) is more preferred from the viewpoint of effectively improving the flame retardancy of the building material. Further, the above-exemplified flame retardants include the so-called auxiliary flame retardant, which per se has the poor ability to improve flame retardancy, but exhibits a synergistic effect when used in combination with another flame retardant.

The amount of the filler and/or the flame retardant is generally in the range of from 5 to 95% by weight, preferably from 10 to 80% by weight, more preferably from 20 to 70% by weight, based on the weight of the component (a) or (A). If desired, the fillers and the flame retardants may be used in combination. Specifically, two or more different fillers may be used in combination. Alternatively, two or more different flame retardants may be used in combination. Further, at least one filler and at least one flame retardant may be used in combination. When at least one filler and at least one flame retardant are used in combination, it is preferred that the total amount of the filler and the flame retardant is within the above-mentioned range.

Each of the building materials of the present invention can be used in the form of a foam (i.e., a foamed building material). The foamed building material is advantageous in that it has a light weight, an improved flexibility, an improved design and the like. Examples of methods for obtaining a foamed building material include a chemical method which uses a chemical foaming agent, such as an inorganic foaming agent or an organic foaming agent; and a physical method which uses a physical foaming agent. In each of these methods, cells are distributed throughout the building material by addition of a foaming agent. Examples of foaming agents include those which are exemplified as the component (k) in item (iii) above for the "foam". The amount of the foaming agent is generally in the range of from 0.1 to 8 parts by weight, preferably from 0.3 to 6 parts by weight, more preferably from 0.5 to 5 parts by weight, relative to 100 parts by weight of the component (a) or (A).

Each of the building materials of the present invention can be advantageously used as various shaped articles, such as a sheet and a film. For improving the various properties (such as appearance, abrasion resistance, weathering resistance and scratch resistance) of a shaped article of the building material, the surface of the shaped article may be treated by printing, coating, embossing or the like.

With respect to the use of any of the building materials of the present invention, there is no particular limitation. For example, when the building material is used as a flooring material, a wall material or a ceiling material, the building material may be used in the form of a coating material for coating the surface of a structural material made of a concrete, a metal, a wood or the like. In such case, the building material is provided in the form of a sheet, a film, a tile, a board or the like, and is bonded to a substrate, such as a structural material, by using an adhesive agent, an adhesive material, a nail, a screw or the like. Further, the building material may be used as a sealing material, such as a gasket used for improving the sealability. Examples of specific uses of the building material include a flooring material (such as a tile), an inner wall material, a material for an inner wall of a ceiling, and a window frame gasket, which are used in general housings, office buildings, commercial or public facilities, and the like.

(vi) Vibration Damping, Soundproofing Material

Each of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention can also be used as a vibration damping, soundproofing material. It is preferred that each of the vibration damping, soundproofing materials of the present invention contains a filler and/or a flame retardant. The vibration damping, soundproofing materials of the present invention have excellent properties with respect to flexibility, vibration damping property, soundproofing property, abrasion resistance, scratch resistance, strength and the like.

In each of the vibration damping, soundproofing materials of the present invention, the component (a)/component (b) weight ratio, that is, the weight ratio of the component (a) (i.e., the hydrogenated copolymer, the first-order modified, hydrogenated copolymer, or the second-order modified, hydrogenated copolymer) to the component (b), is generally in the range of from 100/0 to 5/95, preferably from 95/5 to 10/90, more preferably from 95/5 to 20/80.

Examples of fillers used in the vibration damping, soundproofing material include those which are exemplified as the component (j) in item (iii) above for the "foam". Examples of flame retardants used in the vibration damping, soundproofing material include those which are exemplified as the component (l) in item (v) for the "building material". The preferred flame retardants are the same as mentioned above in connection with the building material.

The amount of the filler and/or the flame retardant is generally in the range of from 5 to 95% by weight, preferably from 10 to 80% by weight, more preferably from 20 to 70% by weight, based on the weight of the component (a) or (A). If desired, the fillers and the flame retardants may be used in combination. Specifically, two or more different fillers may be used in combination. Alternatively, two or more different flame retardants may be used in combination. Further, at least one filler and at least one flame retardant may be used in combination. When at least one filler and at least one flame retardant are used in combination, it is preferred that the total amount of the filler and the flame retardant is within the above-mentioned range.

Each of the vibration damping, soundproofing materials of the present invention may be in the form of a foam (i.e., a foamed, vibration damping, soundproofing material). The foamed, vibration damping, soundproofing material is advantageous in that it has a light weight, an improved flexibility, an improved design and the like. Examples of methods for obtaining a foamed, vibration damping, soundproofing material include a chemical method which uses a chemical foaming agent, such as an inorganic foaming agent or an organic foaming agent; and a physical method which uses a physical foaming agent. In each of these methods, cells are distributed throughout the vibration damping, soundproofing material by addition of a foaming agent. Examples of foaming agents include those which are exemplified as the component (k) in item (iii) above for the "foam". The amount of the foaming agent is generally in the range of from 0.1 to 8 parts by weight, preferably from 0.3 to 6 parts by weight, more preferably from 0.5 to 5 parts by weight, relative to 100 parts by weight of the component (a) or (A).

Each of the vibration damping, soundproofing materials of the present invention can be advantageously used as various shaped articles, such as a sheet and a film. For improving the various properties (such as appearance, abrasion resistance, weathering resistance and scratch resistance) of a shaped article of the vibration damping, soundproofing material, the surface of the shaped article may be treated by printing, coating, embossing or the like.

(vii) Electric Wire Coating Material

Each of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention can also be used as an electric wire coating material. It is preferred that each of the electric wire coating materials of the present invention contains a filler and/or a flame retardant. The electric wire coating materials of the present invention have excellent properties with respect to insulating property, flexibility and peelability, so that the electric wire coating materials are suitable as a coating material for an electric wire, a power cable, a communication cable, a power transmission line and the like.

In each of the electric wire coating materials of the present invention, the component (a)/component (b) weight ratio, that is, the weight ratio of the component (a) (i.e., the hydrogenated copolymer, the first-order modified, hydrogenated copolymer, or the second-order modified, hydrogenated copolymer) to the component (b), is generally in the range of from 100/0 to 5/95, preferably from 95/5 to 10/90, more preferably from 95/5 to 20/80.

Examples of fillers used in the electric wire coating material include those which are exemplified as the component (j) in item (iii) above for the "foam". Examples of flame retardants used in the electric wire coating material include those which are exemplified as the component (l) in item (v) above for the "building material". Preferred examples of flame retardants used in the electric wire coating material are the same as the preferred flame retardants exemplified in item (v) above for the "building material".

(viii) Adhesive Composition

An adhesive composition can be prepared by adding a tackifier (hereinafter frequently referred to as "component (n)") to any of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention. The adhesive compositions of the present invention exhibit an excellent balance of adhesion properties (such as adhesion strength) and exhibit an excellent stability in melt viscosity at high temperatures, so that the adhesive compositions can be advantageously used as a material for an adhesive layer of an adhesive tape, an adhesive sheet or film, and a surface protection sheet or film for an adhesive label, and as an adhesive.

In each of the adhesive compositions of the present invention, the amount of the tackifier is generally in the range of from 20 to 400 parts by weight, preferably from 50 to 350 parts by weight, relative to 100 parts by weight of the component (a) or (A). When the amount of the tackifier is less than 20 parts by weight, it is unlikely that the adhesive composition exhibits satisfactory adhesion. On the other hand, when the amount of the tackifier is more than 400 parts by weight, the softening point of the adhesive composition becomes lower. Therefore, in either case, the adhesion properties of the adhesive composition tend to be impaired.

In each of the adhesive compositions of the present invention, the component (a)/component (b) weight ratio, i.e., the weight ratio of the component (a) (i.e., the hydrogenated copolymer, the first-order modified, hydrogenated copolymer, or the second-order modified, hydrogenated copolymer) to the component (b), is generally in the range of from 50/50 to 97/3, preferably from 60/40 to 95/5, more preferably from 70/30 to 90/10.

With respect to the tackifier, there is no particular limitation, and any of the conventional adhesion properties-imparting resins can be used. Examples of conventional adhesion properties-imparting resins include a polyterpene resin, a hydrogenated rosin terpene resin, a terpene/phenol resin and an alicyclic hydrocarbon resin. These tackifiers can be used individually or in combination. Specific examples of tackifiers include those which are described in the above-mentioned "Gomu Purasuchikku Haigou Yakuhin (Additives for Rubber and Plastic)" (Rubber Digest Co., Ltd., Japan), such as Clearon P105 (polyterpene resin), Clearon P125 (polyterpene resin), Arkon P-90 (alicyclic hydrocarbon resin) and Arkon P-115 (alicyclic hydrocarbon resin).

Each of the adhesive compositions may contain a conventional softening agent, such as a naphthenic process oil, a paraffinic process oil, or a mixture thereof. Specific examples of softening agents include the rubber-softening agents which are exemplified as the component (i) in item (i) above for the "reinforcing filler-containing composition". The incorporation of a softening agent in the adhesive composition is advantageous in that the viscosity of the adhesive composition is reduced, so that the processability and adhesion properties of the adhesive composition are improved. The amount of the softening agent is preferably from 0 to 200 parts by weight, more preferably from 0 to 150 parts by weight, relative to 100 parts by weight of the component (a) or (A). When the amount of the softening agent is more than 200 parts by weight, the retention of the adhesion properties of the adhesive composition tends to be markedly impaired.

Further, if desired, each of the adhesive compositions may contain a stabilizer. Examples of stabilizers include the antioxidants, light stabilizers and ultraviolet light absorbers which are described in the above-mentioned "Gomu Purasuchikku Haigou Yakuhin (Additives for Rubber and Plastic)" (Rubber Digest Co., Ltd., Japan). Also, the adhesive composition may contain at least one member selected from the group consisting of pigments, such as red iron oxide and titanium dioxide; waxes, such as a paraffin wax, a microcrystalline wax, and a low molecular weight polyethylene wax; olefin thermoplastic resins (such as amorphous polyolefin and an ethylene/ethyl acrylate copolymer) and low molecular weight vinyl aromatic thermoplastic resins; natural rubbers; synthetic rubbers, such as a polyisoprene rubber, a polybutadiene rubber, a styrene/butadiene rubber, an ethylene/propylene rubber, a chloroprene rubber, an acrylic rubber, an isoprene/isobutylene rubber, a polypentenamer rubber, a styrene/butadiene block copolymer, a hydrogenated block copolymer obtained by hydrogenating a styrene/butadiene block copolymer, a styrene/isoprene block copolymer, and a hydrogenated block copolymer obtained by hydrogenating a styrene/isoprene block copolymer.

With respect to the method for producing each of the adhesive compositions, there is no particular limitation. For example, the adhesive composition can be produced by a method in which the components are uniformly mixed using a conventional mixer or kneader while heating.

Each of the adhesive compositions exhibits not only excellent melt viscosity and excellent adhesive strength, but also excellent stability in melt viscosity. That is, the adhesive composition exhibits an excellent balance of adhesion properties. By virtue of these excellent properties, the adhesive composition can be used as a material for an adhesive tape and label, a pressure-sensitive lamina, a pressure-sensitive sheet, a surface protection sheet and film, a back adhesive for fixing a lightweight plastic shaped article, a back adhesive for fixing a carpet or tile, and an adhesive. Especially, the adhesive composition can be advantageously used as a material for an adhesive tape, an adhesive sheet and film, an adhesive label, a surface protection sheet and film, and an adhesive.

(ix) Asphalt Composition

An asphalt composition can be prepared by adding an asphalt (hereinafter frequently referred to as "component (o)") to any of the hydrogenated copolymer of the present invention, the first-order modified, hydrogenated copolymer of the present invention, and the second-order modified, hydrogenated copolymer of the present invention. The asphalt compositions of the present invention exhibit an excellent balance of asphalt properties, such as ductility, and storage stability at high temperatures. By virtue of these excellent properties, the asphalt compositions can be advantageously used as a material for road paving, a roofing sheet, a waterproof sheet, a sealant and the like.

Examples of asphalts used in each of the asphalt compositions of the present invention include a petroleum asphalt (i.e., asphalt by-produced by oil refining), a mixture thereof with petroleum, natural asphalt, and a mixture thereof with petroleum. Each of the above-mentioned asphalts contains bitumen as the main component thereof. Specific examples of asphalts include a straight asphalt, a semi-blown asphalt, a blown asphalt, tar, pitch, a cutback asphalt (i.e., a mixture of asphalt with oil), and an asphalt emulsion. These asphalts can be used individually or in combination.

As a preferred example of the asphalt, there can be mentioned a straight asphalt having a penetration ratio of from 30 to 300, preferably from 40 to 200, more preferably from 45 to 150, wherein the penetration ratio of the asphalt is measured in accordance with JIS K 2207.

In each of the asphalt compositions of the present invention, the amount of the component (a) (i.e., the hydrogenated copolymer, the first-order modified, hydrogenated copolymer, or the second-order modified, hydrogenated copolymer) is generally in the range of from 0.5 to 50 parts by weight, preferably from 1 to 30 parts by weight, more preferably from 3 to 20 parts by weight, relative to 100 parts by weight of the asphalt contained in the asphalt composition.

If desired, each of the asphalt compositions may contain an additive. Examples of additives include inorganic fillers, such as calcium carbonate, magnesium carbonate, talc, silica, alumina, titanium oxide, a glass fiber and glass beads; organic reinforcing agents, such as an organic fiber and a coumarone/indene resin; crosslinking agents, such as an organic peroxide and an inorganic peroxide; pigments, such as titanium white, carbon black and iron oxide; dyes; flame retardants; antioxidants; ultraviolet absorbers; antistatic agents; lubricants; softening agents, such as a paraffinic process oil, a naphthenic process oil, an aromatic process oil, a paraffin, an organopolysiloxane and a mineral oil; plasticizers; adhesion imparting resins, such as a coumarone/indene resin and a terpene resin.

Further examples of additives include olefin resins, such as an atactic polypropylene and an ethylene/ethyl acrylate copolymer; low molecular weight vinyl aromatic thermoplastic resins; natural rubbers; synthetic rubbers, such as a polyisoprene rubber, an ethylene/propylene rubber, a chloroprene rubber, an acrylic rubber, an isoprene/isobutylene rubber, a styrene/butadiene block copolymer and a hydrogenation product thereof (other than the hydrogenated copolymer of the present invention), and a styrene/isoprene block copolymer and a hydrogenation product thereof (other than the hydrogenated copolymer of the present invention); vulcanizing agents, such as sulfur; auxiliary vulcanizing agents; and fillers. These additives can be used individually or in combination. When it is intended to use the asphalt composition as a material for road paving, the composition is generally used in the form of a mixture thereof with an aggregate, such as mineral type crushed stone, sand or slag.

As described above, each of the hydrogenated copolymer of the present invention, the first-order modified, hydrogenated copolymer of the present invention, the second-order modified, hydrogenated copolymer of the present invention, the hydrogenated copolymer composition of the present invention, the first-order modified, hydrogenated copolymer composition of the present invention, and the second-order modified, hydrogenated copolymer composition of the present invention can be used in various fields. When it is intended to use the copolymer or copolymer composition of the present invention in the form of a shaped article, the molding thereof can be performed by a method selected from the group consisting of an extrusion molding, an injection molding, a blow molding, air-pressure molding, a vacuum molding, a foam molding, a multilayer extrusion molding, a multilayer injection molding, a high frequency weld molding, a slush molding and a calender molding. Examples of shaped articles include a sheet, a film, a tube, a nonwoven fabric, a fibrous shaped article, and a synthetic leather substitute. The shaped articles of the copolymer or copolymer composition of the present invention can be advantageously used as a packaging material for foods; a material for medical instruments; a material for household electric appliances and parts thereof, electronic devices and parts thereof, automobile parts, industrial parts, household utensils and toys; a material for footwear, fiber and an adhesive; and an asphalt modifier. Specific examples of automobile parts include a side mall, a grommet, a knob, a weatherstrip, a window frame and a sealant therefor, an armrest, a door grip, a steering wheel grip, a console box, a headrest, an instrument panel, a bumper, a spoiler, and a storage cover for an air-bag device. Specific examples of medical instruments include a blood bag, a bag for storing platelets, a transfusion bag, a bag for artificial dialysis, a medical tubing, and a catheter. Further, the copolymer or copolymer composition of the present invention can be used in a substrate for an adhesive tape, sheet or film; a substrate for a surface protection film; an adhesive for a surface protection film; an adhesive for a carpet; a stretch wrapping film; a heat shrinkable film; a coating material for a coated steel pipe; and a sealant.

BEST MODE FOR CARRYING OUT THE INVENTION

Hereinbelow, the present invention will be described in more detail with reference to the following Reference Examples, Examples and Comparative Examples, which should not be construed as limiting the scope of the present invention.

In the following Examples and Comparative Examples, unhydrogenated copolymers were hydrogenated to thereby obtain hydrogenated copolymers. As mentioned above, the unhydrogenated copolymers are frequently referred to as "base unhydrogenated copolymers".

The characteristics and properties of copolymers were measured by the below-mentioned methods.

I. Various Hydrogenated Copolymers

I-1) Styrene Content:

The styrene content of the base unhydrogenated copolymer was determined using an ultraviolet spectrophotometer (trade name: UV-2450; manufactured and sold by Shimadzu Corporation, Japan). The styrene content of the base unhydrogenated copolymer was used as the styrene content of the hydrogenated copolymer.

On the other hand, when the hydrogenated copolymer was directly subjected to a measurement, the measurement was performed by means of a nuclear magnetic resonance (NMR) apparatus (trade name: DPX-400; manufactured and sold by BRUKER, Germany).

I-2) Styrene Polymer Block Content (Os Value):

The styrene polymer block content of the base unhydrogenated copolymer was determined by the osmium tetraoxide degradation method described in I. M. Kolthoff et al., J. Polym. Sci. vol. 1, p. 429 (1946). For the degradation of the unhydrogenated copolymer, a solution obtained by dissolving 0.1 g of osmic acid in 125 ml of tertiary butanol was used. (The value of the styrene polymer block content obtained by the osmium tetraoxide degradation method is referred to as an "Os value").

Also, the styrene polymer block content of the hydrogenated copolymer was directly measured by the method described in Y. Tanaka et al., RUBBER CHEMISTRY and TECHNOLOGY, vol. 54, p. 685 (1981), using a nuclear magnetic resonance (NMR) apparatus (trade name: JMN-270WB; manufactured and sold by JEOL LTD., Japan). Specifically, a sample solution was prepared by dissolving 30 mg of the hydrogenated copolymer in 1 g of deuterated chloroform, and the sample solution was subjected to $^1$H-NMR spectrometry to obtain the $^1$H-NMR spectrum of the hydrogenated copolymer. From the $^1$H-NMR spectrum, the total integral value, the integral value of the chemical shifts in the range of from 6.9 to 6.3 ppm, and the integral value of the chemical shifts in the range of from 7.5 to 6.9 ppm were obtained. Using these integral values, the styrene polymer block content (Ns value) of the hydrogenated copolymer was obtained. The Ns value was then converted to the Os value. The Os value was obtained by the following calculation:

Block styrene $(St)$ intensity = $((6.9$ to $6.3$ ppm$)$ integral value$)/2$

Random styrene $(St)$ intensity =

$(7.5$ to $6.9$ ppm$)$ integral value $- 3$(block $St$ intensity)

Ethylene/butylene $(EB)$ intensity =

(total integral value) $- 3\{$(block $St$ intensity) + (random $St$ intensity)$\}/8$ Styrene polymer block content $(Ns$ value$) = 104$ (block $St$ intensity)$/[104\{$(block $St$ intensity) + (random $St$ intensity)$\}$ +

$56(EB$ intensity$)]$ $Os$ value $= -0.012$ $(Ns)^2 + 1.8$ $(Ns) - 13.0$

I-3) Content of the Hydrogenated Copolymer Block (B) Obtained by Hydrogenating an Unhydrogenated Random Copolymer Block:

The content of the unhydrogenated random copolymer block in the base unhydrogenated copolymer was obtained from the amounts of conjugated diene monomers and vinyl aromatic monomers used for producing the unhydrogenated random copolymer block. The content of the unhydrogenated random copolymer block in the base unhydrogenated copolymer was used as the content of the hydrogenated copolymer block (B) in the hydrogenated copolymer.

I-4) Content of the Hydrogenated Polymer Block (C) Obtained by Hydrogenating an Unhydrogenated Conjugated Diene Polymer Block:

The content of the unhydrogenated conjugated diene polymer block in the base unhydrogenated copolymer was obtained from the amount of conjugated diene monomers used for producing the unhydrogenated conjugated diene polymer block. The content of the unhydrogenated conjugated diene polymer block in the base unhydrogenated copolymer was used as the content of the hydrogenated polymer block (C) in the hydrogenated copolymer.

I-5) Vinyl Bond Content:

The vinyl bond content of the conjugated diene polymer block (homopolymer block) in the base unhydrogenated copolymer was calculated by the Morello method, based on the results of a measurement using an infrared spectrophotometer (trade name: FT/IR-230; manufactured and sold by Japan Spectroscopic Co., Ltd., Japan). On the other hand, the vinyl bond content of the conjugated diene/styrene copolymer block in the base unhydrogenated copolymer was calculated by the Hampton method, based on the results of a measurement using the above-mentioned infrared spectrophotometer.

When the hydrogenated copolymer was directly subjected to a measurement, the measurement was performed by means of a nuclear magnetic resonance (NMR) apparatus (trade name: DPX-400; manufactured and sold by BRUKER, Germany).

I-6) Weight Average Molecular Weight and Molecular Weight Distribution:

The weight average molecular weight of the hydrogenated copolymer is approximately equal to that of the base unhydrogenated copolymer. Therefore, the weight average molecular weight of the base unhydrogenated copolymer was used as the weight average molecular weight of the hydrogenated copolymer.

The weight average molecular weight of the base unhydrogenated copolymer was measured by gel permeation chromatography (GPC) using a GPC apparatus (manufactured and sold by Waters Corporation, U.S.A.) under conditions wherein tetrahydrofuran was used as a solvent and the measuring temperature was 35° C. The measurement of the weight average molecular weight from a GPC chromatogram was performed using a calibration curve obtained with respect to commercially available standard monodisperse polystyrene samples having predetermined molecular weights, wherein the calibration curve was obtained using a standard type polystyrene gel column (trade name: Shodex; manufactured and sold by Showa Denko Co., Ltd., Japan). From the GPC chromatogram, the weight average molecular weight of the base unhydrogenated copolymer was obtained.

From the GPC chromatogram, the number average molecular weight of the unhydrogenated copolymer was also obtained.

The molecular weight distribution is defined as the ratio (Mw/Mn) of the weight average molecular weight (Mw) to the number average molecular weight (Mn).

I-7) Modification Ratio:

A modified copolymer adsorbs on a silica gel column but not on a polystyrene gel column. Based on such a unique property of the modified copolymer, the modification ratio of the modified copolymer was determined by the following method. A sample solution containing a modified copolymer sample and a low molecular weight internal standard polystyrene is prepared, and the prepared sample solution is subjected to GPC using the same standard type polystyrene gel column as used in item I-6) above, thereby obtaining a chromatogram. On the other hand, another chromatogram is obtained by subjecting the same sample solution to GPC in substantially the same manner as mentioned above, except that a silica gel column (trade name: Zorbax; manufactured and sold by DuPont de Nemours & Company Inc., U.S.A.) is used in place of the standard type polystyrene gel column. From the difference between the chromatogram obtained using the polystyrene gel column and the chromatogram obtained using the silica gel column, the amount of the copolymer fraction (contained in the modified copolymer) having adsorbed on the silica gel column is determined. From the determined amount of the copolymer fraction, the modification ratio of the modified copolymer is obtained.

I-8) Hydrogenation Ratio of the Double Bonds in Conjugated Diene Monomer Units:

The hydrogenation ratio was measured by means of a nuclear magnetic resonance (NMR) apparatus (trade name: DPX-400; manufactured and sold by BRUKER, Germany).

I-9) Temperature at which a Peak of Loss Tangent (tan δ) is Observed:

A dynamic viscoelastic spectrum was obtained by means of a dynamic viscoelastic spectrum analyzer (type: DVE-VE; manufactured and sold by Rheology Co., Ltd., Japan), wherein the analysis was performed at a frequency of 10 Hz.

I-10) Crystallization Peak and Quantity of Heat at the Crystallization Peak:

The crystallization peak of the hydrogenated copolymer and the quantity of heat at the crystallization peak were measured by means of a differential scanning calorimeter (DSC) (trade name: DSC3200S; manufactured and sold by MAC Science Co., Ltd., Japan). Specifically, the measurement was performed by the following method. The hydrogenated copolymer is fed to the differential scanning calorimeter. The internal temperature of the differential scanning calorimeter is elevated at a rate of 30° C./min from room temperature to 150° C. and, then, lowered at a rate of 10° C./min from 150° C. to −100° C., thereby obtaining a DSC chart (i.e., crystallization curve) with respect to the hydrogenated copolymer. From the obtained DSC chart, whether or not the crystallization peak is present is confirmed. When a crystallization peak is observed in the DSC chart, the temperature at which the crystallization peak is observed is defined as the crystallization peak temperature, and the quantity of heat at the crystallization peak is measured.

I-11) Tensile Strength, Flexibility and Tensile Permanent Set:

With respect to a specimen of the hydrogenated copolymer, the tensile strength thereof and the stress required to stretch the specimen by 100% were measured in accordance with JIS K 6251 (this stress value is hereinafter referred to as the "100% modulus") under conditions wherein the pulling rate was 500 mm/min and the temperature was 23° C. The 100% modulus was used as an index of the flexibility of the hydrogenated copolymer. The smaller the 100% modulus, the higher the flexibility. It is preferred that the 100% modulus of the hydrogenated copolymer is 120 kg/cm2 or less.

The tensile permanent set of the hydrogenated copolymer is defined as follows. A specimen of the hydrogenated copolymer is subjected a tensile test (described in JIS K 6262) in which the specimen is pulled at a rate of 200 mm/min and at 23° C. until the specimen is broken. The elongation at break of the specimen, and the residual elongation of the specimen at a point in time of 24 hours after the breakage thereof are measured. The tensile permanent set (%) is defined by the following formula:

Tensile permanent set (%)=(L2/L1)×100 wherein L1 represents the distance between the two gage marks when the specimen is broken, and L2 represents the distance between the two gage marks at a point in time of 24 hours after the breakage of the specimen.

I-12) Abrasion Resistance:

Using a Color Fastness Rubbing Tester (trade name: AB-301; manufactured and sold by TESTER SANGYO CO., LTD., Japan), the leather grained surface of a sheet obtained by molding the hydrogenated copolymer was abraded 10,000 times with an abrading cloth (canequim No. 3) under a load of 500 g. The decrease in volume of the sheet, which was caused by the 10,000 times abrasion of the sheet, was measured, and used as a yardstick for the abrasion resistance of the hydrogenated copolymer. Specifically, the abrasion resistance of the hydrogenated copolymer was evaluated by the following criteria:

⊚: The decrease in volume of the sheet, which is caused by the 10,000 times abrasion of the sheet, is 0.01 ml or less.

◯: The decrease in volume of the sheet, which is caused by the 10,000 times abrasion of the sheet, is from more than 0.01 ml to 0.05 ml.

Δ: The decrease in volume of the sheet, which is caused by the 10,000 times abrasion of the sheet, is from more than 0.05 ml to 0.10 ml.

X: The decrease in volume of the sheet, which is caused by the 10,000 times abrasion of the sheet, is more than 0.10 ml.

I-13) Anti-Impact Scratch Property:

The anti-impact scratch property of the hydrogenated copolymer was evaluated by the following method. To a compression-molded specimen (a sheet having a thickness of 2 mm) of the hydrogenated copolymer is dropped a wedge (weight: 500 g) having a tip having a length of 10 mm and a width of 1 mm, wherein the wedge is dropped from the point which is 10 cm above the specimen, thereby forming a scratch on the specimen. The surface of the compression-molded specimen is scanned with a laser by means of a surface texture measuring instrument (manufactured and sold by TOKYO SEIMITSU CO., Japan) to thereby measure the depth (unit: μm) of the scratch on the specimen. When the depth of the scratch on the specimen is 40 μm or less, this means that the hydrogenated copolymer exhibits excellent anti-impact scratch property. The values described in Tables 1 and 4 below indicate the depths (unit: μm) of the scratches on the specimens.

I-14) Adhesion Properties:

The adhesion strength of the hydrogenated copolymer was measured by the T-type peel strength test, and used as a yardstick for the adhesion properties of the hydrogenated copolymer. The greater the adhesion strength, the better the adhesion properties.

The T-type peel strength test was performed under the following conditions.

Adhesion conditions under which a specimen is prepared: A sample copolymer and an adherend are preheated at 160°

C. for five minutes and, then, pressed for five minutes under a load of 1 kg/cm², thereby obtaining a specimen.

Conditions under which the peel strength test is performed: The peel strength test is performed at a pulling rate of 200 mm/min.

The adherend used for preparing the specimen was an aluminum plate (thickness: 100 μm) or a PET film (thickness: 50 μm).

Hydrogenation catalysts I and II used in the hydrogenation reactions of unmodified or modified copolymers in the Examples and Comparative Examples below were prepared by the following methods.

REFERENCE EXAMPLE 1

Preparation of Hydrogenation Catalyst I

A reaction vessel was purged with nitrogen. To the reaction vessel was fed one liter of dried, purified cyclohexane, followed by addition of 100 mmol of bis($\eta^5$-cyclopentadienyl) titanium dichloride. While thoroughly stirring the resultant mixture in the reaction vessel, an n-hexane solution of 200 mmol of trimethylaluminum was fed to the reaction vessel, and a reaction was performed at room temperature for about 3 days to thereby obtain hydrogenation catalyst I (which contained titanium).

REFERENCE EXAMPLE 2

Preparation of Hydrogenation Catalyst II

A reaction vessel was purged with nitrogen. To the reaction vessel was fed two liters of dried, purified cyclohexane, followed by addition of 40 mmol of bis($\eta^5$-cyclopentadienyl) titanium di(p-tolyl) and 150 g of 1,2-polybutadiene having a molecular weight of about 1,000 and a 1,2-vinyl bond content of about 85%. To the resultant solution was added a cyclohexane solution containing 60 mmol of n-butyllithium, and a reaction was performed at room temperature for 5 minutes. To the resultant reaction mixture was immediately added 40 mmol of n-butanol, followed by stirring, thereby obtaining hydrogenation catalyst II.

EXAMPLE 1

An unhydrogenated copolymer was produced by performing a continuous polymerization by the following method in which there were used two reaction vessels (i.e., a first reaction vessel and a second reaction vessel), each of which had an internal volume of 10 liters and was equipped with a stirrer and a jacket.

A cyclohexane solution of butadiene (butadiene concentration: 24% by weight), and a cyclohexane solution of n-butyllithium (which contained 0.110% by weight of n-butyllithium, based on the total weight of the monomers (i.e., the total weight of the butadiene fed to the two reaction vessels and the styrene fed to the second reaction vessel)) were fed to the bottom portion of the first reaction vessel at feeding rates of 2.06 liters/hr and 1.3 liters/hr, respectively, while feeding a cyclohexane solution of N,N,N',N'-tetramethylethylenediamine (TMEDA) to the bottom portion of the first reaction vessel at a feeding rate such that the amount of the TMEDA was 0.08 mol per mol of the above-mentioned n-butyllithium, thereby performing a continuous polymerization at 70° C. to obtain a polymerization reaction mixture containing a polymer. In the continuous polymerization, the reaction temperature was adjusted by controlling the jacket temperature. The temperature around the bottom portion of the first reaction vessel was about 69° C. and the temperature around the top of the first reaction vessel was about 70° C. The average residence time of the polymerization reaction mixture in the first reaction vessel was about 145 minutes. The conversion of butadiene was approximately 100%. A sample of the polymer in the first reaction vessel was analyzed. As a result, it was found that the polymer had a vinyl bond content of 16% as measured with respect to the butadiene monomer units in the polymer.

From the first reaction vessel, a polymer solution was withdrawn, and fed to the bottom portion of the second reaction vessel. Simultaneously with the feeding of the polymer solution, a cyclohexane solution of butadiene (butadiene concentration: 24% by weight) and a cyclohexane solution of styrene (styrene concentration: 24% by weight) were fed to the bottom portion of the second reaction vessel at feeding rates of 3.03 liters/hr and 7.68 liters/hr, respectively, while feeding a cyclohexane solution of TMEDA to the bottom portion of the second reaction vessel at a feeding rate such that the amount of the TMEDA was 0.30 mol per mol of the n-butyllithium fed to the first reaction vessel, thereby performing a continuous polymerization at 90° C. to obtain an unhydrogenated copolymer. The conversions of butadiene and styrene as measured at the outlet of the second reaction vessel were approximately 100% and 98%, respectively.

The obtained unhydrogenated copolymer was analyzed by the above-mentioned methods. As a result, it was found that the unhydrogenated copolymer had a styrene content of 63% by weight, a styrene polymer block content of 0% by weight, and a vinyl bond content of 14.8% by weight as measured with respect to the butadiene monomer units in the copolymer. It was also found by calculation that the random copolymer block of the unhydrogenated copolymer had a vinyl bond content of 14% as measured with respect to the butadiene monomer units in the random copolymer block.

The unhydrogenated copolymer had a weight average molecular weight of 170,000 and a molecular weight distribution of 1.8.

Then, to the unhydrogenated copolymer was added the above-mentioned hydrogenation catalyst I in an amount of 100 ppm by weight, in terms of the amount of titanium, based on the weight of the unhydrogenated copolymer, and a hydrogenation reaction was performed under conditions wherein the hydrogen pressure was 0.7 MPa and the reaction temperature was 65° C. After completion of the hydrogenation reaction, methanol was added to the second reaction vessel, followed by addition of, as a stabilizer, octadecyl-3-(3,5-di-t-butyl-4-hydroxyphenyl)propionate in an amount of 0.3 part by weight, relative to 100 parts by weight of the unhydrogenated copolymer, to thereby obtain a hydrogenated copolymer (hereinafter, this hydrogenated copolymer is referred to as "polymer 1").

Polymer 1 had a hydrogenation ratio of 98%. Further, the styrene content of polymer 1 was measured using an NMR apparatus, and found to be 63% by weight. That is, the content of styrene monomer units in the hydrogenated copolymer (polymer 1) was identical to the content of styrene monomer units in the base unhydrogenated copolymer.

The characteristics and properties of polymer 1 are shown in Table 1 below.

EXAMPLE 2

An unhydrogenated copolymer was produced by performing substantially the same continuous polymerization as in Example 1, except that the following changes were made: the feeding rates of the cyclohexane solution of butadiene and cyclohexane solution of n-butyllithium to the first reaction vessel were changed to 4.13 liters/hr and 1.60 liters/hr, respectively; the feeding rate of the cyclohexane solution of TMEDA to the first reaction vessel was changed to a rate such that the amount of the TMEDA was 0.10 mol, per mol of the n-butyllithium; the feeding rates of the cyclohexane solution of butadiene and cyclohexane solution of styrene to the second reaction vessel were changed to 2.61 liters/hr and 6.21 liters/hr, respectively; and the feeding rate of the cyclohexane solution of TMEDA to the second reaction vessel was changed to a rate such that the amount of the TMEDA was 0.30 mol per mol of the n-butyllithium.

Using the produced unhydrogenated copolymer, a hydrogenated copolymer (hereinafter, this hydrogenated copolymer is referred to as "polymer 2") was produced by performing substantially the same hydrogenation reaction as in Example 1. The characteristics and properties of polymer 2 are shown in Table 1.

EXAMPLE 3

Using the first reaction vessel employed in Example 1, an unhydrogenated copolymer was produced by performing a batchwise polymerization as follows.

To the reaction vessel was added a cyclohexane solution of 20 parts by weight of butadiene (butadiene concentration: 24% by weight). Then, to the reaction vessel were added n-butyllithium in an amount of 0.08% by weight, based on the total weight of the monomers (i.e., the total weight of the butadiene and styrene added to the reaction vessel), and TMEDA in an amount of 0.12 mol per mol of the above-mentioned n-butyllithium, and a polymerization was performed at 70° C. for 1 hour. Then, a sample of the resultant polymer in the reaction vessel was analyzed. As a result, it was found that the polymer had a vinyl bond content of 20%. To the reaction vessel was added a cyclohexane solution of 25 parts by weight of butadiene and 55 parts by weight of styrene (total concentration of butadiene and styrene: 24% by weight), and a polymerization was performed at 70° C. for 1 hour to obtain an unhydrogenated copolymer. The obtained unhydrogenated copolymer had a styrene content of 55% by weight, a styrene polymer block content of 0% by weight, a vinyl bond content of 20% by weight (as measured with respect to the butadiene monomer units in the copolymer), a weight average molecular weight of 150,000 and a molecular weight distribution of 1.1.

Using the obtained unhydrogenated copolymer, a hydrogenated copolymer (hereinafter, this hydrogenated copolymer is referred to as "polymer 3") was produced by performing substantially the same hydrogenation reaction as in Example 1. Polymer 3 had a hydrogenation ratio of 99%. The characteristics and properties of polymer 3 are shown in Table 1.

EXAMPLE 4

Using the first reaction vessel employed in Example 1, an unhydrogenated copolymer was produced by performing a batchwise polymerization as follows.

To the reaction vessel was added a cyclohexane solution of 15 parts by weight of butadiene (butadiene concentration: 24% by weight). Then, to the reaction vessel were added n-butyllithium in an amount of 0.09% by weight, based on the total weight of the monomers (i.e., the total weight of the butadiene and styrene fed to the reaction vessel), and TMEDA in an amount of 0.10 mol per mol of the above-mentioned n-butyllithium, and a polymerization was performed at 70° C. for 1 hour. To the reaction vessel was added a cyclohexane solution of 20 parts by weight of butadiene and 50 parts by weight of styrene (total concentration of butadiene and styrene: 24% by weight), and a polymerization was performed at 70° C. for 1 hour. Further, to the reaction vessel was added a cyclohexane solution of 15 parts by weight of styrene (styrene concentration: 24% by weight), and a polymerization reaction was performed at 70° C. for 1 hour to obtain an unhydrogenated copolymer.

The obtained unhydrogenated copolymer had a styrene content of 65% by weight, a styrene polymer block content of 15% by weight, a vinyl bond content of 18% by weight (as measured with respect to the butadiene monomer units in the copolymer), a weight average molecular weight of 145,000 and a molecular weight distribution of 1.1.

Using the obtained unhydrogenated copolymer, a hydrogenated copolymer (hereinafter, this hydrogenated copolymer is referred to as "polymer 4") was produced by performing substantially the same hydrogenation reaction as in Example 1. The characteristics and properties of polymer 4 are shown in Table 1.

EXAMPLE 5

An unhydrogenated copolymer was produced by performing a continuous polymerization in substantially the same manner as in Example 2. Upon completion of the continuous polymerization, to the resultant living polymer was added 1,3-dimethyl-2-imidazolidinone as a modifier in an amount equimolar to the n-butyllithium used in the continuous polymerization, thereby obtaining a modified copolymer. The modified copolymer had a modification ratio of 75%.

Using the modified copolymer, a modified, hydrogenated copolymer (hereinafter, this modified, hydrogenated copolymer is referred to as "polymer 5") was produced by performing substantially the same hydrogenation reaction as in Example 1, except that the above-mentioned hydrogenation catalyst II was used in place of the above-mentioned hydrogenation catalyst I. Polymer 5 exhibited excellent flexibility, excellent abrasion resistance and excellent anti-impact scratch property which were comparable to those of polymer 2. Further, it was found that polymer 5 had excellent adhesion properties. Specifically, polymer 5 exhibited an adhesion strength of 70 gf/cm on an aluminum plate and an adhesion strength of 40 gf/cm on a PET film.

COMPARATIVE EXAMPLE 1

Using the first and second reaction vessels employed in Example 1, an unhydrogenated copolymer was produced by performing a continuous polymerization as follows.

A cyclohexane solution of butadiene (butadiene concentration: 24% by weight), a cyclohexane solution of styrene (styrene concentration: 24% by weight), and a cyclohexane solution of n-butyllithium (which contained 0.077% by weight of n-butyllithium, based on the total weight of the monomers (i.e., the total weight of the butadiene fed to the first reaction vessel and the styrene fed to the two reaction vessels)) were fed to the bottom portion of the first reaction vessel at feeding rates of 4.51 liters/hr, 2.06 liters/hr and 2.0 liters/hr, respectively, while feeding a cyclohexane solution of TMEDA to the bottom portion of the first reaction vessel at a feeding rate such that the amount of the TMEDA was 0.44 mol per mol of the above-mentioned n-butyllithium, thereby performing a continuous polymerization at 90° C. In the continuous polymerization, the reaction temperature was adjusted by controlling the jacket temperature.

From the first reaction vessel, a polymer solution was withdrawn, and fed to the bottom portion of the second reaction vessel. Simultaneously with the feeding of the polymer solution, a cyclohexane solution of styrene (styrene concentration: 24% by weight) was fed to the bottom portion of the second reaction vessel at a feeding rate of 1.37 liters/hr, thereby performing a continuous polymerization at 90° C. to obtain an unhydrogenated copolymer.

The obtained unhydrogenated copolymer was analyzed by the above-mentioned methods. As a result, it was found that the unhydrogenated copolymer had a styrene content of 45% by weight, a styrene polymer block content of 18% by weight, a vinyl bond content of 15% by weight (as measured with respect to the butadiene monomer units in the copolymer), a weight average molecular weight of 202,000 and a molecular weight distribution of 1.9.

Using the obtained unhydrogenated copolymer, a hydrogenated copolymer (hereinafter, this hydrogenated copolymer is referred to as "polymer 6") was produced by performing substantially the same hydrogenation reaction as in Example 1. The characteristics and properties of polymer 6 are shown in Table 1.

COMPARATIVE EXAMPLE 2

Using the first reaction vessel employed in Example 1, an unhydrogenated copolymer was produced by performing a batchwise polymerization as follows.

To the reaction vessel was added a cyclohexane solution of 20 parts by weight of butadiene (butadiene concentration: 24% by weight). Then, to the reaction vessel were added n-butyllithium in an amount of 0.07% by weight, based on the total weight of the monomers (i.e., the total weight of the butadiene and styrene fed to the reaction vessel), and TMEDA in an amount of 0.20 mol per mol of the above-mentioned n-butyllithium, and a polymerization was performed at 70° C. for 1 hour. Then, a sample of the resultant polymer in the reaction vessel was analyzed. As a result, it was found that the polymer had a vinyl bond content of 25%. To the reaction vessel were added a cyclohexane solution of 50 parts by weight of butadiene and 30 parts by weight of styrene (total concentration of butadiene and styrene: 24% by weight), and TMEDA in an amount of 0.07 mol per mol of the above-mentioned n-butyllithium, and a polymerization was performed at 70° C. for 1 hour to obtain an unhydrogenated copolymer. The obtained unhydrogenated copolymer had a styrene content of 30% by weight, a styrene polymer block content of 0% by weight, a vinyl bond content of 37% by weight (as measured with respect to the butadiene monomer units in the copolymer), a weight average molecular weight of 190,000 and a molecular weight distribution of 1.1.

Using the obtained unhydrogenated copolymer, a hydrogenated copolymer (hereinafter, this hydrogenated copolymer is referred to as "polymer 7") was produced by performing substantially the same hydrogenation reaction as in Example 1. The characteristics and properties of polymer 7 are shown in Table 1.

COMPARATIVE EXAMPLE 3

Using the first reaction vessel employed in Example 1, an unhydrogenated copolymer was produced by performing a batchwise polymerization as follows.

To the reaction vessel was added a cyclohexane solution of 20 parts by weight of butadiene (butadiene concentration: 24% by weight). Then, to the reaction vessel were added n-butyllithium in an amount of 0.08% by weight, based on the total weight of the monomers (i.e., the total weight of the butadiene and styrene fed to the reaction vessel), and TMEDA in an amount of 0.10 mol per mol of the above-mentioned n-butyllithium, and a polymerization was performed at 70° C. for 1 hour. Then, a sample of the resultant polymer in the reaction vessel was analyzed. As a result, it was found that the polymer had a vinyl bond content of 18%. To the reaction vessel were added a cyclohexane solution of 55 parts by weight of butadiene and 20 parts by weight of styrene (total concentration of butadiene and styrene: 24% by weight), and TMEDA in an amount of 0.30 mol per mol of the above-mentioned n-butyllithium, and a polymerization was performed at 70° C. for 1 hour. Further, to the reaction vessel was added a cyclohexane solution of 5 parts by weight of styrene (styrene concentration: 24% by weight), and a polymerization reaction was performed at 70° C. for 1 hour to obtain an unhydrogenated copolymer.

The obtained unhydrogenated copolymer had a styrene content of 25% by weight, a styrene polymer block content of 5% by weight, a vinyl bond content of 22% by weight (as measured with respect to the butadiene monomer units in the copolymer), a weight average molecular weight of 165,000 and a molecular weight distribution of 1.1.

Using the obtained unhydrogenated copolymer, a hydrogenated copolymer (hereinafter, this hydrogenated copolymer is referred to as "polymer 8") was produced by performing substantially the same hydrogenation reaction as in Example 1. The characteristics and properties of polymer 8 are shown in Table 1.

COMPARATIVE EXAMPLE 4

Various properties of a commercially available flexible vinyl chloride (PVC) (trade name: SUMIFLEX K580CF1; manufactured and sold by Sumitomo Bakelite Co., Ltd., Japan) were measured. The results are shown in Table 1.

II. Various Types of Hydrogenated Copolymer Compositions

In Examples 6 to 9 below, hydrogenated copolymer compositions were produced. The components used and the methods for measuring the properties of the hydrogenated copolymer compositions are as follows:

II-1) Tensile Properties:

Tensile properties (specifically, tensile strength and elongation at break) were measured by substantially the same method as described in item I-11) above, except that the pulling rate was changed to 500 mm/min.

II-2) Abrasion Resistance:

The abrasion resistance was measured by the same method as described in item I-12) above.

Thermoplastic Resins

PP-1: a propylene homopolymer (trade name: PM801A; manufactured and sold by SunAllomer Ltd., Japan);

PP-2: a random copolymer of propylene monomer units (trade name: PC630A; manufactured and sold by SunAllomer Ltd., Japan)

Rubbery Polymer

SEBS: a hydrogenated block copolymer obtained by hydrogenating a styrene/butadiene block copolymer (trade name: TUFTEC H1221; manufactured and sold by ASAHI KASEI CORPORATION, Japan)

EXAMPLES 6 TO 9

In each of Examples 6 to 9, a hydrogenated copolymer, a thermoplastic resin and a rubbery polymer (wherein the types and amounts of these components are indicated in Table 2 below) were melt-kneaded and extruded by means of a twin-screw extruder (trade name: PCM30; manufactured and sold by Ikegai Corporation, Japan) under conditions wherein the cylinder temperature was 230° C. and the screw revolution rate was 300 rpm, followed by pelletization, thereby obtaining a hydrogenated copolymer composition in the form of pellets. The obtained composition was subjected to a compression molding to prepare a sheet having a thickness of 2 mm. Using the sheet, the above-mentioned properties of the polymer composition were measured. The results are shown in Table 2.

III. Properties of a Dynamically Crosslinked, Hydrogenated Copolymer

In Examples 10 and 11 below, dynamically crosslinked, hydrogenated copolymers were produced. The components used and the methods for measuring the properties of the copolymers are as follows:

Thermoplastic Resins
PP-2: the above-mentioned PC630A
Rubbery Polymer
SEBS: the above-mentioned TUFTEC H1221
III-1) Tensile Strength and Elongation at Break:

The tensile strength and elongation at break were measured by substantially the same method as described in item II-1) above.

III-2) Abrasion Resistance:

The abrasion resistance was measured by the same method as described in item II-2) above.

III-3) Compression Set:

A compression set test was performed at 70° C. for 22 hours in accordance with JIS K 6262. The smaller the compression set, the better the heat resistance.

EXAMPLES 10 AND 11

In each of Examples 10 and 11, a hydrogenated copolymer, a thermoplastic resin, a rubbery polymer and an organic peroxide (wherein the types and amounts of these components are indicated in Table 3 below and the organic peroxide is "PERHEXA 25B", manufactured and sold by NOF Corporation, Japan) were melt-kneaded and extruded by means of the above-mentioned twin-screw extruder, followed by pelletization, thereby obtaining a hydrogenated copolymer composition in the form of pellets. The melt-kneading in Example 10 was performed under conditions wherein the cylinder temperature was 210° C. and the screw revolution rate was 250 rpm, and the melt-kneading in Example 11 was performed under conditions wherein the cylinder temperature was 230° C. and the screw revolution rate was 250 rpm. In each of Examples 10 and 11, the hydrogenated copolymer composition was subjected to a compression molding using a hydraulic molding machine (manufactured and sold by Shoji Co., Ltd., Japan; output: 36 tons), thereby obtaining a sheet having a thickness of 2 mm. Using the sheet, the above-mentioned properties of the hydrogenated copolymer composition were measured. The results are shown in Table 3.

In each of Examples 12 to 18 and Comparative Example 5 below, an unmodified or modified copolymer having at least two styrene polymer blocks was produced. The properties of the unmodified or modified copolymer were measured by substantially the same method as described in item I above.

EXAMPLE 12

Using the first reaction vessel employed in Example 1, an unhydrogenated copolymer was produced by performing a polymerization as follows.

The reaction vessel was charged with 10 parts by weight of cyclohexane and the internal temperature of the reaction vessel was adjusted to 70° C. To the reaction vessel were added n-butyllithium in an amount of 0.072% by weight, based on the total weight of the monomers (i.e., the total weight of the butadiene and styrene fed to the reaction vessel), and TMEDA in an amount of 0.8 mol per mol of the n-butyllithium. Then, a cyclohexane solution of 10 parts by weight of styrene (styrene concentration: 22% by weight) was fed to the reaction vessel over about 3 minutes, and a polymerization reaction was performed for 30 minutes while maintaining the internal temperature of the reaction vessel at about 70° C.

Subsequently, a cyclohexane solution of 35 parts by weight of butadiene and 45 parts by weight of styrene (total concentration of butadiene and styrene: 22% by weight) was continuously fed to the reaction vessel at a constant rate over 60 minutes while maintaining the internal temperature of the reaction vessel at about 70° C.

Then, a cyclohexane solution of 10 parts by weight of styrene (styrene concentration: 22% by weight) was further added to the reaction vessel over about 3 minutes, and a polymerization reaction was performed for 30 minutes while maintaining the internal temperature of the reaction vessel at about 70° C., thereby obtaining an unhydrogenated copolymer. The obtained unhydrogenated copolymer had a styrene content of 65% by weight and a styrene polymer block content of 20% by weight.

Then, to the obtained unhydrogenated copolymer was added the above-mentioned hydrogenation catalyst I in an amount of 100 ppm by weight, in terms of the amount of titanium, based on the weight of the unhydrogenated copolymer, and a hydrogenation reaction was performed under conditions wherein the hydrogen pressure was 0.7 MPa and the reaction temperature was 65° C. After completion of the hydrogenation reaction, methanol was added to the reaction vessel, followed by addition of, as a stabilizer, octadecyl-3-(3,5-di-t-butyl-4-hydroxyphenyl)propionate in an amount of 0.3% by weight, based on the weight of the unhydrogenated copolymer, to thereby obtain a hydrogenated copolymer (hereinafter, this hydrogenated copolymer is referred to as "polymer 9"). Polymer 9 had a hydrogenation ratio of 97%. In a DSC chart obtained with respect to polymer 9, no crystallization peak was observed. The characteristics and properties of polymer 9 are shown in Table 4 below.

70 Parts by weight of polymer 9, 30 parts by weight of the above-mentioned PC630A as a polypropylene resin, 25 parts by weight of calcium carbonate and 0.4 part by weight of microcrystalline wax were mixed together by means of a Henschel mixer. The resultant mixture was melt-kneaded by means of the above-mentioned twin-screw extruder under conditions wherein the cylinder temperature was 230° C. and the screw revolution rate was 250 rpm, thereby obtaining a composition.

EXAMPLE 13

Using the first reaction vessel employed in Example 1, an unhydrogenated copolymer was produced by performing a polymerization as follows.

The reaction vessel was charged with 10 parts by weight of cyclohexane and the internal temperature of the reaction vessel was adjusted to 70° C. To the reaction vessel were added n-butyllithium in an amount of 0.25% by weight, based on the total weight of the monomers (i.e., the total weight of the butadiene and styrene fed to the reaction vessel), and TMEDA in an amount of 0.7 mol per mol of the n-butyllithium. Then, a cyclohexane solution of 22 parts by weight of styrene (styrene concentration: 22% by weight) was added to the reaction vessel over about 3 minutes, and a polymerization reaction was performed for 30 minutes while maintaining the internal temperature of the reaction vessel at about 70° C.

Subsequently, a cyclohexane solution of 34 parts by weight of butadiene and 44 parts by weight of styrene (total concentration of butadiene and styrene: 22% by weight) was continuously fed to the reaction vessel at a constant rate over 60 minutes while maintaining the internal temperature of the reaction vessel at about 70° C., thereby obtaining a living polymer of an unhydrogenated copolymer.

Then, to the living polymer of an unhydrogenated copolymer was added silicon tetrachloride as a coupling agent in an amount of ¼ mol per mol of the n-butyllithium used in the polymerization, and a reaction was performed to thereby obtain an unhydrogenated copolymer. The obtained unhydrogenated copolymer had a styrene content of 66% by weight and a styrene polymer block content of 22% by weight.

Then, using the unhydrogenated copolymer, a hydrogenated copolymer (hereinafter, this hydrogenated copolymer is referred to as "polymer 10") was produced by performing substantially the same hydrogenation reaction as in Example 12. Polymer 10 had a hydrogenation ratio of 98%. In a DSC chart obtained with respect to polymer 10, no crystallization peak was observed. The characteristics and properties of polymer 10 are shown in Table 4.

Parts by weight of polymer 10, 35 parts by weight of the polypropylene resin (i.e., the above-mentioned PC630A), 35 parts by weight of the above-mentioned TUFTEC H1221 as a hydrogenated block copolymer (obtained by hydrogenating a styrene/butadiene block copolymer), 50 parts by weight of calcium carbonate and 0.5 part by weight of erucic acid amid were mixed together by means of a Henschel mixer. The resultant mixture was melt-kneaded by means of the above-mentioned twin-screw extruder under conditions wherein the cylinder temperature was 230° C. and the screw revolution rate was 250 rpm, thereby obtaining a composition.

COMPARATIVE EXAMPLE 5

Using the first reaction vessel employed in Example 1, an unhydrogenated copolymer was produced by performing a polymerization as follows.

The reaction vessel was charged with 10 parts by weight of cyclohexane and the internal temperature of the reaction vessel was adjusted to 70° C. To the reaction vessel were added 0.0041 part by weight of potassium t-butoxide and 0.07 part by weight n-butyllithium, each relative to 100 parts by weight of the total weight of the monomers (i.e., the total weight of the butadiene and styrene fed to the reaction vessel); hence, the n-butyllithium/potassium t-butoxide molar ratio was 30. Then, a cyclohexane solution of 70 parts by weight of a mixture of butadiene and styrene (butadiene/styrene weight ratio: 20/80; total concentration of butadiene and styrene: 22% by weight) was fed to the reaction vessel, and a polymerization reaction was performed for 3 hours while maintaining the internal temperature of the reaction vessel at about 70° C.

Subsequently, a cyclohexane solution of 30 parts by weight of a mixture of butadiene and styrene (butadiene/styrene weight ratio: 70/30; total concentration of butadiene and styrene: 22% by weight) was fed to the reaction vessel, and a polymerization reaction was performed for 3 hours while maintaining the internal temperature of the reaction vessel at about 70° C., thereby obtaining an unhydrogenated copolymer. The unhydrogenated copolymer had a styrene content of 65% by weight and a styrene polymer block content of 8% by weight.

Then, using the obtained unhydrogenated copolymer, a hydrogenated copolymer (hereinafter, this hydrogenated copolymer is referred to as "polymer 11") was produced by performing substantially the same hydrogenation reaction as in Example 12.

Polymer 11 had a hydrogenation ratio of 97%. In a DSC chart obtained with respect to polymer 11, a crystallization peak was observed at 35° C., wherein the quantity of heat at 35° C. was 4.7 J/g. The characteristics and properties of polymer 11 are shown in Table 4.

EXAMPLE 14

Using the first and second reaction vessels employed in Example 1, an unhydrogenated copolymer was produced by performing a continuous polymerization as follows.

A cyclohexane solution of styrene (styrene concentration: 24% by weight), and a cyclohexane solution of n-butyllithium (which contained 0.15% by weight of n-butyllithium, based on the total weight of the monomers (i.e., the total weight of the styrene fed to the two reaction vessels and the butadiene fed to the second reaction vessel)) were fed to the bottom portion of the first reaction vessel at feeding rates of 2.38 liters/hr and 2.0 liters/hr, respectively, while feeding a cyclohexane solution of TMEDA to the bottom portion of the first reaction vessel at a feeding rate such that the amount of the TMEDA was 0.44 mol per mol of the above-mentioned n-butyllithium, thereby performing a continuous polymerization at 70° C.

From the first reaction vessel, a polymer solution was withdrawn, and fed to the bottom portion of the second reaction vessel. Simultaneously with the feeding of the polymer solution, a cyclohexane solution of butadiene (butadiene concentration: 24% by weight) and a cyclohexane solution of styrene (styrene concentration: 24% by weight) were fed to the bottom portion of the second reaction vessel at feeding rates of 4.51 liters/hr and 5.97 liters/hr, respectively, thereby performing a continuous polymerization to obtain a solution of a living polymer. In the continuous polymerization, the reaction temperature was adjusted by controlling the jacket temperature. The temperature around the bottom portion of the second reaction vessel was about 88° C. and the temperature around the top of the second reaction vessel was about 90° C. The solution of a living polymer was withdrawn from the second reaction vessel. To the solution of a living polymer withdrawn from the second reaction vessel was added ethyl benzoate in an amount equimolar to the n-butyllithium fed to the first reaction vessel, and a coupling reaction was performed, thereby obtaining an unhydrogenated copolymer.

Using the obtained unhydrogenated copolymer, a hydrogenated copolymer (hereinafter, this hydrogenated copolymer is referred to as "polymer 12") was produced by performing substantially the same hydrogenation reaction as in Example 13.

Polymer 12 had a styrene content of 67% by weight. With respect to the styrene polymer block content of polymer 12, the Os value as determined by the osmium tetraoxide degradation method with respect to the unhydrogenated copolymer, was 20% by weight, and the Os value as calculated by the above-mentioned formula from the Ns value determined by the NMR method with respect to polymer 12 (i.e., the hydrogenated copolymer), was also 20% by weight. The vinyl bond content of polymer 12 was 14% by weight as measured with respect to the butadiene monomer units in polymer 12. The vinyl bond content as measured with respect to the unhydrogehated copolymer and the vinyl bond content as measured with respect to polymer 12 (i.e., the hydrogenated copolymer) were identical to each other (14% by weight). Polymer 12 had a hydrogenation ratio of 96%. In a dynamic viscoelastic spectrum obtained with respect to polymer 12, a peak of tan δ was observed at 8° C., wherein the peak was ascribed to the styrene/butadiene random copolymer block. Further, in a DSC chart obtained with respect to polymer 12, no crystallization peak was observed at −50 to 100° C., and the quantity of heat was 0.

It was found that polymer 12 was a hydrogenated copolymer having excellent properties with respect to flexibility, tensile strength and abrasion resistance, and exhibiting only a small tensile permanent set.

EXAMPLE 15

Using the first reaction vessel employed in Example 1, an unhydrogenated copolymer was produced by performing a polymerization as follows.

The reaction vessel was charged with a cyclohexane solution of 135 g of styrene (styrene concentration: 24% by weight); a cyclohexane solution of n-butyllithium (which contained 0.065% by weight of n-butyllithium, based on the total weight of the monomers (i.e., the total weight of the styrene and butadiene fed to the reaction vessel)); and a cyclohexane solution of TMEDA which contained 0.75 mol of TMEDA per mol of the n-butyllithium. Then, a polymerization was performed at about 70° C. for 30 minutes. Subsequently, the internal temperature of the reaction vessel was elevated to 90° C. Then, a cyclohexane solution of 990 g of styrene and 240 g of butadiene (total concentration of styrene and butadiene: 24% by weight) was continuously fed to the reaction vessel at a constant rate over 1 hour to thereby perform a polymerization reaction while maintaining the internal temperature of the reaction vessel in the range of 90±3° C. Subsequently, a cyclohexane solution of 135 g of styrene (styrene concentration: 24% by weight) was continuously fed to the reaction vessel at a constant rate over 5 minutes, and a polymerization reaction was performed at about 90° C., thereby obtaining an unhydrogenated copolymer.

Using the obtained unhydrogenated copolymer, a hydrogenated copolymer (hereinafter, this hydrogenated copolymer is referred to as "polymer 13") was produced by performing substantially the same hydrogenation reaction as in Example 13. Polymer 13 had a styrene content of 84% by weight, a styrene polymer block content of 18% by weight, a vinyl bond content of 11% (as measured with respect to the butadiene monomer units in polymer 13), and a hydrogenation ratio of 98%. In a dynamic viscoelastic spectrum obtained with respect to polymer 13, a peak of tan δ was observed at 45° C., wherein the peak was ascribed to the styrene/butadiene random copolymer block. Further, in a DSC chart obtained with respect to polymer 13, no crystallization peak was observed at −50 to 100° C., and the quantity of heat was 0.

It was found that polymer 13 was a hydrogenated copolymer having excellent properties with respect to flexibility, tensile strength and abrasion resistance, and exhibiting only a small tensile permanent set.

EXAMPLE 16

A first-order modified, hydrogenated copolymer (hereinafter, this first-order modified, hydrogenated copolymer is referred to as "polymer 14") was produced in the form of a solution thereof by performing substantially the same operation as in Example 14, except that the following changes were made: to the solution of a living polymer withdrawn from the second reaction vessel was added tetraglycidyl-1,3-bisaminomethyl-cyclohexane as a modifier (hereinafter referred to as "first-order modifier M1") in an amount of 0.5 mol per mol of the n-butyllithium used in the polymerization; and, in the hydrogenation reaction, hydrogenation catalyst II was used in place of hydrogenation catalyst I. Polymer 14 had a modification ratio of about 75%.

To the solution of polymer 14 was added maleic anhydride (hereinafter referred to as "second-order modifier D1") in an amount of 1 mol, relative to one equivalent of the functional group (derived from the first-order modifier M1) bonded to polymer 14, and a reaction was performed at about 60° C., to thereby obtain a second-order modified, hydrogenated copolymer (hereinafter referred to as "polymer 15").

It was found that polymer 15 was a second-order modified, hydrogenated copolymer having excellent properties with respect to flexibility, tensile strength and abrasion resistance, and exhibiting only a small tensile permanent set.

EXAMPLE 17

A first-order modified, hydrogenated copolymer (hereinafter, this first-order modified, hydrogenated copolymer is referred to as "polymer 16") was produced by performing substantially the same operation as in Example 15, except that the following changes were made: to the living polymer produced in the reaction vessel was added 1,3-dimethyl-2-imidazolidinone as a modifier (hereinafter referred to as "first-order modifier M2") in an amount equimolar to the n-butyllithium used in the polymerization; and, in the hydrogenation reaction, hydrogenation catalyst II was used in place of hydrogenation catalyst I. Polymer 16 had a modification ratio of about 80%, that is, the amount of the unmodified copolymer fraction in polymer 16 was about 20% by weight, based on the weight of polymer 16.

To polymer 16 was added second-order modifier D1 in an amount of 2.1 mol, relative to one equivalent of the functional group (derived from the first-order modifier M2) bonded to polymer 16, and the resultant mixture was melt-kneaded by means of the above-mentioned twin-screw extruder under conditions wherein the cylinder temperature was 210° C. and the screw revolution rate was 100 rpm, thereby obtaining a second-order modified, hydrogenated copolymer (hereinafter referred to as "polymer 17").

It was found that polymer 17 was a second-order modified, hydrogenated copolymer having excellent properties with respect to flexibility, tensile strength and abrasion resistance, and exhibiting only a small tensile permanent set.

EXAMPLE 18

A first-order modified, hydrogenated copolymer (hereinafter, this first-order modified, hydrogenated copolymer is referred to as "polymer 18") was produced by performing substantially the same operation as in Example 17, except that γ-glycidoxypropyltriethoxysilane was used as a first-order modifier. Using the thus produced polymer 18, a second-order modified, hydrogenated copolymer (hereinafter, this second-order modified, hydrogenated copolymer is referred to as "polymer 19") was produced by performing substantially the same operation as in Example 17.

It was found that polymer 19 was a second-order modified, hydrogenated copolymer having excellent properties with respect to flexibility, tensile strength and abrasion resistance, and exhibiting only a small tensile permanent set.

In each of Examples 19 and 20 below, a hydrogenated copolymer composition containing a hydrogenated copolymer having at least two styrene polymer blocks (A) was produced.

The thermoplastic resin and rubbery copolymer used and the methods for measuring the properties of the compositions are the same as in item II above.

EXAMPLES 19 AND 20

In each of Examples 19 and 20, a hydrogenated copolymer, a thermoplastic resin and a rubbery polymer (wherein the types and amounts of these components are indicated in Table 5 below) were melt-kneaded and extruded by means of the above-mentioned twin-screw extruder under conditions wherein the cylinder temperature was 230° C. and the screw revolution rate was 300 rpm, followed by pelletization, thereby obtaining a hydrogenated copolymer composition in the form of pellets. The composition was subjected to a compression molding to obtain a sheet having a thickness of 2 mm. Using the sheet, the above-mentioned properties of the polymer composition were measured. The results are shown in Table 5.

EXAMPLES 21 AND 22

In accordance with the formulations indicated in Table 6 below, hydrogenated copolymer compositions in the form of foams were produced. It was found that each of the foams exhibited excellent properties as aimed at by the present invention.

EXAMPLES 23 TO 28

In accordance with the formulations indicated in Table 7 below, hydrogenated copolymer compositions were produced. It was found that each of the compositions exhibited excellent properties as aimed at by the present invention.

The present invention has been described hereinabove in detail with reference to the above-mentioned specific embodiments. However, it is apparent to a person skilled in the art that various modifications and alterations can be made without any deviation from the spirit and scope of the present invention.

The present application is based on Japanese Patent Application Nos. 2002-187325, 2002-189562 and 2003-87488 which were filed on Jun. 27, 2002, Jun. 28, 2002 and Mar. 27, 2003, respectively, and the contents of the specifications of these patent applications are incorporated in the present specification by the reference.

TABLE 1

Characteristics and properties of hydrogenated copolymers (1)

| | | Structure of copolymer | | | | |
|---|---|---|---|---|---|---|
| | | Hydrogenated conjugated diene polymer block (C) | | Hydrogenated random copolymer block (B) | | |
| | Polymer number | Vinyl bond content as measured with respect to the conjugated diene monomer units (%) | C block content (% by weight) | Vinyl bond content as measured with respect to the conjugated diene monomer units (%) | B block content (% by weight) | Content of styrene polymer block (A) (% by weight) |
| Ex. 1 | Polymer 1 | 16 | 15 | 14 | 85 | 0 |
| Ex. 2 | Polymer 2 | 20 | 30 | 16 | 70 | 0 |
| Ex. 3 | Polymer 3 | 20 | 20 | 20 | 80 | 0 |
| Ex. 4 | Polymer 4 | 18 | 15 | 18 | 70 | 15 |
| Comp. Ex. 1 | Polymer 6 | — | 0 | 15 | 82 | 18 |
| Comp. Ex. 2 | Polymer 7 | 25 | 20 | 40 | 80 | 0 |
| Comp. Ex. 3 | Polymer 8 | 18 | 20 | 25 | 75 | 5 |
| Comp. Ex. 4 | PVC | — | — | — | — | — |

| | | Structure of copolymer | | | | | | Properties of copolymer | |
|---|---|---|---|---|---|---|---|---|---|
| | Polymer number | Styrene content (% by weight) | Weight average molecular weight (×10,000) | Molecular weight distribution (Mw/Mn) | Hydrogenation ratio (%) | Peak of tan δ (° C.) | 100% modulus (kg/cm$^2$) | Abrasion resistance | Anti-impact scratch property (μm) |
| Ex. 1 | Polymer 1 | 63 | 17.0 | 1.8 | 98 | 27 | 32 | ⊚ | 16 |
| Ex. 2 | Polymer 2 | 51 | 15.5 | 1.9 | 98 | 25 | 28 | ⊚ | 5 |
| Ex. 3 | Polymer 3 | 55 | 15.0 | 1.1 | 99 | 18 | 30 | ⊚ | 14 |
| Ex. 4 | Polymer 4 | 65 | 14.5 | 1.1 | 99 | 21 | 42 | ⊚ | 20 |
| Comp. Ex. 1 | Polymer 6 | 45 | 20.2 | 1.9 | 98 | −40 | 7 | X | nd |
| Comp. Ex. 2 | Polymer 7 | 30 | 19.0 | 1.1 | 99 | −32 | 6 | X | nd |
| Comp. Ex. 3 | Polymer 8 | 25 | 16.5 | 1.1 | 98 | −50 | 6 | X | nd |

TABLE 1-continued

Characteristics and properties of hydrogenated copolymers (1)

| | | | | | | | | | |
|---|---|---|---|---|---|---|---|---|---|
| Comp. Ex. 4 | PVC | — | — | — | — | — | 47 | ○ | 40 |

Note:
"nd" means that the measurement was not conducted.

TABLE 2

Properties of copolymer compositions

| | | | Example 6 | Example 7 | Example 8 | Example 9 |
|---|---|---|---|---|---|---|
| Formulation (part by weight) | Hydrogenated copolymer | Polymer 2 | 80 | 80 | 70 | 40 |
| | Thermoplastic resin | PP-1 | 20 | — | — | — |
| | | PP-2 | — | — | 15 | 30 |
| | Rubbery polymer | SEBS | — | 20 | 15 | 30 |
| Properties | Tensile strength (kg/cm$^2$) | | 180 | 200 | 160 | 160 |
| | Elongation at break (%) | | 420 | 440 | 460 | 500 |
| | Abrasion resistance | | ○ | ○ | ○ | ○ |

TABLE 3

Properties of crosslink products

| | | | Example 10 | Example 11 |
|---|---|---|---|---|
| Formulation (part by weight) | Hydrogenated copolymer | Polymer 2 | 100 | 40 |
| | | | | 30 |
| | Thermoplastic resin | PP-2 | | |
| | Rubbery polymer | SEBS | | 30 |
| | Organic peroxide | PERHEXA 25B | 1 | 0.3 |
| Properties | Tensile strength (kg/cm$^2$) | | 155 | 100 |
| | Elongation at break (%) | | 480 | 900 |
| | Abrasion resistance | | ◎ | ○ |
| | Compression set (%) | | 70 | 75 |

TABLE 5

Properties of polymer compositions

| | | | Example 19 | Example 20 |
|---|---|---|---|---|
| Formulation (part by weight) | Hydrogenated copolymer | Polymer 9 | 30 | — |
| | | Polymer 10 | — | 40 |
| | Thermoplastic resin | PP-2 | 20 | 20 |
| | Rubbery polymer | SEBS | 50 | 40 |
| Properties | Tensile strength (kg/cm$^2$) | | 130 | 140 |
| | Elongation at break (%) | | 790 | 700 |
| | Abrasion resistance | | ○ | ○ |

TABLE 4

Characteristics and properties of hydrogenated copolymers (2)

| | Polymer number | Structure of copolymer | | | | | |
|---|---|---|---|---|---|---|---|
| | | Styrene content (% by weight) | Styrene polymer block content (% by weight) | Vinyl bond content (% by weight) | Weight average molecular weight (×10,000) | Molecular weight distribution (Mw/Mn) | Hydrogenation ratio (%) |
| Ex. 12 | Polymer 9 | 65 | 20 | 20 | 16.2 | 1.1 | 97 |
| Ex. 13 | Polymer 10 | 66 | 22 | 18 | 18.0 | 1.3 | 98 |
| Comp. Ex. 5 | Polymer 11 | 65 | 8 | 15 | 18.5 | 1.1 | 97 |

| | Polymer number | Structure of copolymer | | Properties of copolymer | | | |
|---|---|---|---|---|---|---|---|
| | | Peak of tan δ (° C.) | Crystallization peak* | Tensile strength (kg/cm$^2$) | 100% modulus (kg/cm$^2$) | Abrasion resistance | Anti-impact scratch property (μm) |
| Ex. 12 | Polymer 9 | 1 | Absent | 280 | 22 | ◎ | 10 |
| Ex. 13 | Polymer 10 | 2 | Absent | 250 | 20 | ◎ | 15 |
| Comp. Ex. 5 | Polymer 11 | 0 | Present (4.7) | 240 | 160 | Δ | 98 |

*When a crystallization peak is present, the figure indicates the quantity of heat (J/g).

TABLE 6

Formulations of foams

| | Component | | Example 21 | Example 22 |
|---|---|---|---|---|
| Formulation (part by weight) | Hydrogenated copolymer | Polymer 9 | 20 | 40 |
| | Thermoplastic resin | EVA *1 | 80 | 60 |
| | Additive | Talc | 10 | 10 |
| | | Peroxide *2 | 0.7 | 0.7 |
| | | Auxiliary crosslinking agent *3 | 0.3 | 0.3 |
| | | Zinc oxide | 1.5 | 1.5 |
| | | Stearic acid | 0.5 | 0.5 |
| | | Zinc stearate | 0.3 | 0.3 |
| | | Foaming agent *4 | 2.5 | 2.5 |

*1: Ethylene/vinyl acetate copolymer having a vinyl acetate content of 18% by weight (product name: EVA460; manufactured and sold by E.I. DuPont de Nemours & Company Inc., U.S.A.)
*2: Dicumyl peroxide
*3: Triallyl isocyanurate
*4: Azodicarbonamido

TABLE 7

Formulations of various compositions

| | Component | | Example 23 | Example 24 | Example 25 | Example 26 | Example 27 | Example 28 |
|---|---|---|---|---|---|---|---|---|
| Formulation (part by weight) | Hydrogenated copolymer | Polymer 2 | — | — | — | — | 40 | — |
| | | Polymer 9 | 30 | 30 | 30 | 30 | — | 40 |
| | Thermoplastic resin | PP-2 | 20 | 5 | 5 | 5 | — | — |
| | | ABS | — | 20 | — | — | — | — |
| | | PPE | — | — | 20 | — | — | — |
| | | PC | — | — | — | 20 | — | — |
| | | PE | — | — | — | — | 60 | 60 |
| | Rubbery polymer | SEBS-2 | 40 | 30 | 30 | 30 | — | — |
| | Oil | Paraffin oil | 10 | 15 | 15 | 15 | — | — |
| | Another additive | Silicone oil | 1 | 1 | 1 | 1 | — | — |

Components used:
PP-2: random propylene copolymer (PC630A; manufactured and sold by SunAllomer Ltd., Japan)
ABS: ABS resin (STYLAC ABS121; manufactured and sold by ASAHI KASEI CORPORATION, Japan)
PPE: polyphenylene ether resin (poly(2,6-dimethyl-1,4-phenylene) ether having a reduced viscosity of 0.54)
PC: PC resin (PC-110; manufactured and sold by ASAHI KASEI CORPORATION, Japan)
PE: LDPE (Suntec L2340; manufactured and sold by ASAHI KASEI CORPORATION, Japan)
SEBS-2: hydrogenation product of styrene/butadiene block copolymer (TUFTEC 1272; manufactured and sold by ASAHI KASEI CORPORATION, Japan)
Paraffin oil: Diana process oil PW-380 (manufactured and sold by Idemitsu Kosan Ltd., Japan)
Silicone oil: SH200-100CS (manufactured and sold by Toray Silicone Co., Ltd., Japan)

INDUSTRIAL APPLICABILITY

The hydrogenated copolymer of the present invention, the first-order modified, hydrogenated copolymer of the present invention, and the second-order modified, hydrogenated copolymer of the present invention have excellent properties with respect to flexibility, tensile strength, abrasion resistance, anti-impact scratch property and crosslinkability. Further, a hydrogenated copolymer composition comprising any of the first- and second-order modified, hydrogenated copolymers and at least one polymer selected from the group consisting of a thermoplastic resin and a rubbery polymer; and a crosslink product of the above-mentioned copolymers or copolymer composition have excellent properties with respect to mechanical properties, abrasion resistance and the like. By virtue of these excellent properties, each of the above-mentioned copolymers, copolymer composition and crosslink product can be advantageously used in or as a reinforcing filler-containing composition, a foam, a multilayer film or multilayer sheet, a building material, a vibration damping, soundproofing material, a multilayer shaped article (such as a multilayer injection molded article), an electric wire coating material, a high frequency welding composition, a slush molding material, an adhesive composition, an asphalt composition and the like. Also, by subjecting the above-mentioned copolymers, compositions and materials to molding (such as injection molding or extrusion molding) or the like, there can be obtained shaped articles having various forms which can be advantageously used in the fields of automobile parts (such as interior and exterior parts of automobiles), various containers (such as packaging containers for foods), household electric appliances, medical instruments, industrial parts, toys and the like.

The invention claimed is:

1. A second-order modified, hydrogenated copolymer obtained: by reacting a first-order modified, hydrogenated copolymer with a second-order modifier,
    said first-order modified, hydrogenated copolymer comprising a hydrogenated copolymer and a functional group-containing first-order modifier group bonded to said hydrogenated copolymer,
    said second-order modifier having a functional group which is reactive to said functional group of said first-order modifier group of said first-order modified, hydrogenated copolymer,
    said hydrogenated copolymer being obtained by hydrogenating an unhydrogenated copolymer comprising conjugated diene monomer units and vinyl aromatic monomer units, said hydrogenated copolymer comprising:
    at least one polymer block selected from the group consisting of a polymer block (A) of vinyl aromatic monomer units, and a hydrogenated polymer block (C) which is obtained by hydrogenating an unhydrogenated polymer block of conjugated diene monomer units, said unhydrogenated polymer block of conjugated diene monomer units having a vinyl bond content of less than 30%, and at least one hydrogenated copolymer block (B) which is obtained by hydrogenating an unhydrogenated random copolymer block comprised of conjugated diene monomer units and vinyl aromatic monomer units, said unhydrogenated random copolymer block having a vinyl bond content of 60% or less as measured with respect to the conjugated diene monomer units in said unhydrogenated random copolymer block, wherein, when said hydrogenated copolymer contains no hydrogenated polymer block (C), said hydrogenated copolymer contains at least two polymer blocks (A), said hydrogenated copolymer having the following characteristics (1) to (6):

(1) said hydrogenated copolymer has a content of said vinyl aromatic monomer units of from more than 40% by weight to less than 95% by weight, based on the weight of said hydrogenated copolymer, (2) said hydrogenated copolymer has a content of said polymer block (A) of 0 to 60% by weight, based on the weight of said hydrogenated copolymer, (3) said hydrogenated copolymer has a weight average molecular weight of from 30,000 to 1,000,000, (4) said hydrogenated copolymer has a hydrogenation ratio of 75% or more, as measured with respect to the double bonds in said conjugated diene monomer units, (5) at least one peak of loss tangent (tan δ) is observed at −10 to 80° C. in a dynamic viscoelastic spectrum obtained with respect to said hydrogenated copolymer, and (6) when said hydrogenated copolymer contains no hydrogenated polymer block (C), substantially no crystallization peak ascribed to said at least one hydrogenated copolymer block (B) is observed at −20 to 80° C. in a differential scanning calorimetry (DSC) chart obtained with respect to said hydrogenated copolymer.

2. The second-order modified, hydrogenated copolymer according to claim 1, wherein said functional group of said second-order modifier comprises at least one member selected from the group consisting of a hydroxyl group, a carboxyl group, an acid anhydride group, an isocyanate group, an epoxy group, a silanol group and an alkoxysilane group.

3. The second-order modified, hydrogenated copolymer according to claim 1, which is a foam.

4. A crosslinked, second-order modified, hydrogenated copolymer obtained by subjecting the second-order modified, hydrogenated copolymer of claim 1 to a crosslinking reaction in the presence of a crosslinking agent.

5. A second-order modified, hydrogenated copolymer composition comprising:

1 to 99 parts by weight, relative to 100 parts by weight of the total of components (a-2) and (b), of (a-2) the second-order modified, hydrogenated copolymer of claim 1, and 99 to 1 part by weight, relative to 100 parts by weight of the total of components (a-2) and (b), of (b) at least one polymer selected from the group consisting of a thermoplastic resin other than the second-order modified, hydrogenated copolymer (a-2) and a rubbery polymer other than the second-order modified, hydrogenated copolymer (a-2).

6. The second-order modified, hydrogenated copolymer composition according to claim 5, which is a foam.

7. A crosslinked, second-order modified, hydrogenated copolymer composition obtained by subjecting the second-order modified, hydrogenated copolymer composition of claim 5 to a crosslinking reaction in the presence of a crosslinking agent.

8. An adhesive composition comprising:

100 parts by weight of the second-order modified, hydrogenated copolymer (a-2) of claim 1, and 20 to 400 parts by weight of a tackifier (n).

9. An asphalt composition comprising:

0.5 to 50 parts by weight of the second-order modified, hydrogenated copolymer (a-2) of claim 1, and 100 parts by weight of an asphalt (o).

\* \* \* \* \*

UNITED STATES PATENT AND TRADEMARK OFFICE
CERTIFICATE OF CORRECTION

| | | |
|---|---|---|
| PATENT NO. | : 7,960,481 B2 | Page 1 of 1 |
| APPLICATION NO. | : 12/078571 | |
| DATED | : June 14, 2011 | |
| INVENTOR(S) | : Masahiro Sasagawa et al. | |

It is certified that error appears in the above-identified patent and that said Letters Patent is hereby corrected as shown below:

Column 68, Line 19, In Claim 1, delete "obtained:" and insert -- obtained --, therefor.

Signed and Sealed this
Sixteenth Day of August, 2011

David J. Kappos
*Director of the United States Patent and Trademark Office*